US012763884B2

(12) United States Patent
Khoshnevisan et al.

(10) Patent No.: US 12,763,884 B2
(45) Date of Patent: Oct. 13, 2026

(54) TYPE 1 HYBRID AUTOMATIC REPEAT REQUEST ACKNOWLEDGMENT CODEBOOK GENERATION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 18/512,472

(22) Filed: Nov. 17, 2023

(65) Prior Publication Data

US 2024/0267162 A1 Aug. 8, 2024

Related U.S. Application Data

(60) Provisional application No. 63/483,090, filed on Feb. 3, 2023.

(51) Int. Cl.
*H04W 72/23* (2023.01)
*H04L 1/1829* (2023.01)

(52) U.S. Cl.
CPC ........... *H04L 1/1861* (2013.01); *H04W 72/23* (2023.01)

(58) Field of Classification Search
CPC . H04W 72/23; H04W 72/231; H04W 72/232; H04L 1/1861; H04L 1/1864; H04L 1/1858; H04L 1/1854; H04L 5/0053
See application file for complete search history.

(56) References Cited

U.S. PATENT DOCUMENTS

| | | | | |
|---|---|---|---|---|
| 12,273,893 B2 * | 4/2025 | Ouchi | .................... | H04W 72/23 |
| 12,438,652 B2 * | 10/2025 | Lei | ......................... | H04L 1/1861 |
| 2020/0305168 A1 * | 9/2020 | Liou | ..................... | H04L 5/0098 |

(Continued)

FOREIGN PATENT DOCUMENTS

| | | | | |
|---|---|---|---|---|
| WO | WO-2022031103 A1 * | 2/2022 | ............ | H04W 72/23 |
| WO | WO-2022217523 A1 * | 10/2022 | ........... | H04L 1/1614 |

OTHER PUBLICATIONS

International Search Report and Written Opinion—PCT/US2023/080537—ISA/EPO—Mar. 18, 2024.

*Primary Examiner* — Phong La
(74) *Attorney, Agent, or Firm* — Holland & Hart LLP

(57) ABSTRACT

Methods, systems, and devices for wireless communication are described. A user equipment (UE) may indicate a UE capability for processing a physical downlink shared channel (PDSCH) and exclude an indication that the UE is capable of monitoring for more than one PDSCH transmission within a slot, per component carrier (CC). The UE may receive control information indicating a codebook configuration for hybrid automatic repeat request (HARQ) acknowledgment (ACK) and including a parameter that enables or disables such a capability for the UE to monitor for more than one PDSCH transmission within a slot. The UE may monitor for one or more downlink shared channel transmissions based on the control information and generate a HARQ-ACK codebook for the downlink transmissions, the codebook including feedback for one or more CCs based on the parameter in the control information.

30 Claims, 19 Drawing Sheets

(56) References Cited

U.S. PATENT DOCUMENTS

| | | | | |
|---|---|---|---|---|
| 2020/0313809 | A1* | 10/2020 | Park | H04L 1/1861 |
| 2022/0109529 | A1* | 4/2022 | Ye | H04W 52/50 |
| 2022/0330307 | A1* | 10/2022 | Korhonen | H04L 1/1854 |
| 2023/0327824 | A1* | 10/2023 | Yang | H04L 1/1854 |
| 2023/0344576 | A1* | 10/2023 | Lim | H04L 5/0044 |
| 2023/0354353 | A1* | 11/2023 | Park | H04L 1/1887 |
| 2023/0422275 | A1* | 12/2023 | Kim | H04L 5/0055 |
| 2024/0039664 | A1* | 2/2024 | Gou | H04L 1/1861 |
| 2024/0080860 | A1* | 3/2024 | Zhang | H04W 72/11 |
| 2024/0267162 | A1* | 8/2024 | Khoshnevisan | H04L 1/1861 |
| 2025/0253977 | A1* | 8/2025 | Yao | H04W 8/22 |

* cited by examiner

1600

TYPE 1 HYBRID AUTOMATIC REPEAT REQUEST ACKNOWLEDGMENT CODEBOOK GENERATION

CROSS REFERENCE

The present application for patent claims the benefit of U.S. Provisional Patent Application No. 63/483,090 by KHOSHNEVISAN et al., entitled "TYPE 1 HYBRID AUTOMATIC REPEAT REQUEST ACKNOWLEDGMENT CODEBOOK GENERATION," filed Feb. 3, 2023, assigned to the assignee hereof, and expressly incorporated by reference herein.

FIELD OF TECHNOLOGY

The following relates to wireless communication, including type 1 hybrid automatic repeat request (HARQ) acknowledgment (ACK) codebook generation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may generate a feedback codebook based on semi-static information, such as a quantity of candidate downlink shared channel occasions. For example, the UE may transmit an indication of whether it is capable of monitoring for more than one physical downlink shared channel (PDSCH) per slot, and a network entity may provide a configuration for the feedback codebook based on the indication. However, such an indication may be poorly defined (e.g., there may be ambiguity regarding whether the indication is to be applied per component carrier (CC), per band, or per cell-group, among other formats) or a network entity may lack support for the indicated UE capability.

SUMMARY

The described techniques relate to improved methods, systems, devices, and apparatuses that support type 1 hybrid automatic repeat request (HARQ) acknowledgment (ACK) codebook generation. For example, the described techniques provide for rules and signaling for determining which user equipment (UE) capabilities and codebook configurations to consider when generating a feedback codebook for physical downlink shared channel (PDSCH) transmissions. Using a rules-based approach, the UE may transmit capability information indicating a UE capability for processing a PDSCH transmission (e.g., a processing or code block group (CBG)-based capability) and indicating that the UE is capable of monitoring for more than one PDSCH per slot, per component carrier (CC). The network entity may enable the UE with a feedback codebook configuration based on the capability information, such that the UE may generate the feedback codebook for one or more PDSCH transmissions based on the configuration. The codebook may include feedback for a set of CCs based on a frequency band associated with the UE capability to monitor for more than one PDSCH per slot, per CC. The codebook may include the feedback based on time domain resource allocation (TDRA) grouping of non-overlapping start and length indicator values (SLIVs).

Alternatively, the capability information may indicate the UE capability and that the UE is capable of monitoring for some quantity of PDSCH transmissions within a slot. That is, the capability information may lack an explicit indication of a quantity of PDSCH transmissions the UE may receive within a slot per CC. The network entity may transmit control information indicating a feedback codebook configuration and a parameter (e.g., a radio resource control (RRC) parameter) that may enable or disable the UE to monitor for more than one PDSCH transmissions per slot. Based on the parameter, the UE may generate the feedback codebook that includes feedback for one or more CCs, the feedback based on the quantity of PDSCH transmissions the network entity may enable the UE to monitor for per slot.

A method for wireless communication at a UE is described. The method may include transmitting capability information that indicates a UE capability for processing of a PDSCH, where the capability information includes an indication that the UE is capable of monitoring for more than one downlink shared channel transmission within a slot per CC, receiving control information indicative of a codebook for HARQ-ACK at the UE, monitoring for one or more downlink shared channel transmissions over one or more CCs based on the control information, and generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

An UE for wireless communication is described. The UE may include one or more memories storing processor-executable code and one or more processors coupled with the one or more memories and individually or collectively operable to execute the code to cause the UE to transmit capability information that indicates a UE capability for processing of a PDSCH, where the capability information includes an indication that the UE is capable of monitoring for more than one downlink shared channel transmission within a slot per CC, receive control information indicative of a codebook for HARQ-ACK at the UE, monitor for one or more downlink shared channel transmissions over one or more CCs, and generate the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

Another UE for wireless communication is described. The UE may include means for transmitting capability information that indicates a UE capability for processing of a PDSCH, where the capability information includes an indication that the UE is capable of monitoring for more than one downlink shared channel transmission within a slot per CC, means for receiving control information indicative of a codebook for HARQ-ACK at the UE, means for monitoring for one or more downlink shared channel transmissions over one or more CCs based on the control information, and means for generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

A non-transitory computer-readable medium storing code for wireless communication at a UE is described. The code may include instructions executable by one or more processors to transmit capability information that indicates a UE capability for processing of a PDSCH, where the capability information includes an indication that the UE is capable of monitoring for more than one downlink shared channel transmission within a slot per CC, receive control information indicative of a codebook for HARQ-ACK at the UE, monitor for one or more downlink shared channel transmissions over one or more CCs, and generate the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

In some examples of the method, UEs, and non-transitory computer-readable medium described herein, generating the codebook may include operations, features, means, or instructions for including the feedback for candidate downlink shared channel occasions over the first set of CCs based on TDRA groups of non-overlapping SLIVs.

Some examples of the method, UEs, and non-transitory computer-readable medium described herein may further include operations, features, means, or instructions for determining the first set of CCs as all of the one or more CCs in a cell group based on the indication in the capability information that indicates that the UE may be capable of monitoring for the more than one downlink shared channel transmission within the slot for at least the frequency band in at least one frequency band combination.

Some examples of the method, UEs, and non-transitory computer-readable medium described herein may further include operations, features, means, or instructions for determining the first set of CCs as all of the one or more CCs in a cell group based on the indication in the capability information that indicates that the UE may be capable of monitoring for the more than one downlink shared channel transmission within the slot for at least the frequency band in at least one frequency band combination that includes the cell group.

Some examples of the method, UEs, and non-transitory computer-readable medium described herein may further include operations, features, means, or instructions for determining the first set of CCs as all of the one or more CCs in the frequency band based on the indication in the capability information that indicates that the UE may be capable of monitoring for the more than one downlink shared channel transmission within the slot for the frequency band in at least one frequency band combination.

Some examples of the method, UEs, and non-transitory computer-readable medium described herein may further include operations, features, means, or instructions for determining the first set of CCs as all of the one or more CCs in the frequency band based on the indication in the capability information that indicates that the UE may be capable of monitoring for the more than one downlink shared channel transmission within the slot for the frequency band in at least one frequency band combination, where the at least one frequency band combination corresponds to the one or more CCs in one or more frequency bands.

In some examples of the method, UEs, and non-transitory computer-readable medium described herein, generating the codebook may include operations, features, means, or instructions for including the feedback for a single candidate downlink shared channel occasion over a second set of CCs without identifying TDRA groups of non-overlapping SLIVs.

In some examples of the method, UEs, and non-transitory computer-readable medium described herein, the UE capability for the processing of the PDSCH included in the capability information includes one or more of a first UE capability associated with a first processing capability, a second UE capability associated with a second processing capability applicable for a set of multiple sub-carrier spacings, and a limited second UE capability associated with the second processing capability applicable for a subset of the set of multiple sub-carrier spacings, in addition to a CBG processing capability, where the first processing capability and the second processing capability may be different.

Some examples of the method, UEs, and non-transitory computer-readable medium described herein may further include operations, features, means, or instructions for determining that the UE may be capable of monitoring for the more than one downlink shared channel transmission within the slot based on the indication being associated with the first UE capability without a CBG processing type being enabled.

Some examples of the method, UEs, and non-transitory computer-readable medium described herein may further include operations, features, means, or instructions for determining that the UE may be capable of monitoring for the more than one downlink shared channel transmission within the slot based on second control information that enables at least one of the second UE capability or the limited second UE capability for the UE.

Some examples of the method, UEs, and non-transitory computer-readable medium described herein may further include operations, features, means, or instructions for determining that the UE may be capable of monitoring for the more than one downlink shared channel transmission within the slot based on the indication being associated with the first UE capability and in an absence of the second UE processing type, the limited second UE processing type, and a CBG processing type being enabled.

Some examples of the method, UEs, and non-transitory computer-readable medium described herein may further include operations, features, means, or instructions for receiving the second control information that enables a CBG processing type for the UE and determining that the UE may be capable of monitoring for the more than one downlink shared channel transmission within the slot based on the indication being associated with the first UE capability and on the CBG processing type being enabled, and in an absence of the second UE processing type and the limited second UE processing type being enabled.

Some examples of the method, UEs, and non-transitory computer-readable medium described herein may further include operations, features, means, or instructions for receiving the second control information that enables a CBG processing type for the UE and enables at least one of the second UE processing type or the limited second UE processing type for the UE and determining that the UE may be capable of monitoring for the more than one downlink shared channel transmission within the slot based on the indication being associated with one of the second UE processing type or the limited second UE processing type and on the CBG processing type being enabled.

Some examples of the method, UEs, and non-transitory computer-readable medium described herein may further include operations, features, means, or instructions for receiving the second control information that enables at least one of the second UE processing type or the limited second UE processing type for the UE and determining that the UE may be capable of monitoring for the more than one downlink shared channel transmission within the slot based on the indication being associated with one of the second UE processing type or the limited second UE processing type, and in an absence of a CBG processing type being enabled.

Some examples of the method, UEs, and non-transitory computer-readable medium described herein may further include operations, features, means, or instructions for determining that the UE may be capable of monitoring for the more than one downlink shared channel transmission within the slot may be further based on at least one of the second UE processing type or the limited second UE processing type indicating that the UE may be capable of monitoring for the more than one downlink shared channel transmission within the slot.

A method for wireless communication at a UE is described. The method may include receiving control information indicative of a codebook for HARQ-ACK at the UE, where the control information includes a first parameter that disables or enables the UE to monitor for more than one downlink shared channel transmission per slot, monitoring for one or more downlink shared channel transmissions based on the control information, and generating the codebook for the HARQ-ACK of the one or more downlink shared channel transmissions, where the codebook is based on the control information and includes feedback for one or more CCs based on the first parameter.

A UE for wireless communication is described. The UE may include one or more memories storing processor-executable code and one or more processors coupled with the one or more memories and individually or collectively operable to execute the code to cause the UE to receive control information indicative of a codebook for HARQ-ACK at the UE, where the control information includes a first parameter that disables or enables the UE to monitor for more than one downlink shared channel transmission per slot, monitor for one or more downlink shared channel transmissions based on the control information, and generate the codebook for the HARQ-ACK of the one or more downlink shared channel transmissions, where the codebook is based on the control information and includes feedback for one or more CCs based on the first parameter.

Another UE for wireless communication is described. The UE may include means for receiving control information indicative of a codebook for HARQ-ACK at the UE, where the control information includes a first parameter that disables or enables the UE to monitor for more than one downlink shared channel transmission per slot, means for monitoring for one or more downlink shared channel transmissions based on the control information, and means for generating the codebook for the HARQ-ACK of the one or more downlink shared channel transmissions, where the codebook is based on the control information and includes feedback for one or more CCs based on the first parameter.

A non-transitory computer-readable medium storing code for wireless communication at a UE is described. The code may include instructions executable by one or more processors to receive control information indicative of a codebook for HARQ-ACK at the UE, where the control information includes a first parameter that disables or enables the UE to monitor for more than one downlink shared channel transmission per slot, monitor for one or more downlink shared channel transmissions, and generate the codebook for the HARQ-ACK of the one or more downlink shared channel transmissions, where the codebook is based on the control information and includes feedback for one or more CCs based on the first parameter.

Some examples of the method, UEs, and non-transitory computer-readable medium described herein may further include operations, features, means, or instructions for transmitting capability information that indicates a UE capability for processing of a PDSCH, where the capability information includes an indication of a quantity of downlink shared channel transmissions the UE may be capable of monitoring for within a slot.

In some examples of the method, UEs, and non-transitory computer-readable medium described herein, the first parameter enables the UE to monitor for the more than one downlink shared channel transmission per slot on a per CC basis, or on a per bandwidth part basis, or on a per cell group basis.

In some examples of the method, UEs, and non-transitory computer-readable medium described herein, receiving the control information may include operations, features, means, or instructions for receiving a second indication of a maximum quantity of downlink shared channel transmissions the UE may be capable of monitoring for within the slot.

Some examples of the method, UEs, and non-transitory computer-readable medium described herein may further include operations, features, means, or instructions for transmitting a second UE capability for monitoring for the control information that includes the first parameter.

Some examples of the method, UEs, and non-transitory computer-readable medium described herein may further include operations, features, means, or instructions for receiving second control information that includes a second parameter that enables the first parameter on a per cell group basis, where the first parameter may be on a per CC basis or on a per bandwidth part basis.

In some examples of the method, UEs, and non-transitory computer-readable medium described herein, receiving the control information may include operations, features, means, or instructions for receiving the first parameter, where the first parameter enables the UE to monitor for more than one downlink shared channel transmissions per slot or disables the UE to monitor for a single downlink shared channel transmission per slot.

In some examples of the method, UEs, and non-transitory computer-readable medium described herein, receiving the control information may include operations, features, means, or instructions for receiving the first parameter, where the first parameter enables the UE to monitor for a single downlink shared channel transmission per slot or disables the UE to monitor for more than one downlink shared channel transmissions per slot.

A method for wireless communication at a network entity is described. The method may include receiving capability information that indicates a UE capability for processing of a PDSCH, where the capability information includes an indication that a UE is capable of monitoring for more than one downlink shared channel transmission within a slot per CC, transmitting control information indicative of a codebook for HARQ-ACK at the UE, transmitting one or more downlink shared channel transmissions over one or more CCs, and receiving feedback for a first set of CCs which is at least a portion of the one or more CCs, the feedback included in the codebook, where the first set of CCs for which the feedback is included is based on a frequency band associated with the indication in the capability information.

A network entity for wireless communication is described. The network entity may include one or more memories storing processor-executable code and one or more processors coupled with the one or more memories and individually or collectively operable to execute the code to cause the UE to receive capability information that indicates a UE capability for processing of a PDSCH, where the capability information includes an indication that a UE is capable of monitoring for more than one downlink shared channel transmission within a slot per CC, transmit control information indicative of a codebook for HARQ-ACK at the UE, transmit one or more downlink shared channel transmissions over one or more CCs, and receive feedback for a first set of CCs which is at least a portion of the one or more CCs, the feedback included in the codebook, where the first set of CCs for which the feedback is included is based on a frequency band associated with the indication in the capability information.

Another network entity for wireless communication is described. The network entity may include means for receiving capability information that indicates a UE capability for processing of a PDSCH, where the capability information includes an indication that a UE is capable of monitoring for more than one downlink shared channel transmission within a slot per CC, means for transmitting control information indicative of a codebook for HARQ-ACK at the UE, means for transmitting one or more downlink shared channel transmissions over one or more CCs, and means for receiving feedback for a first set of CCs which is at least a portion of the one or more CCs, the feedback included in the codebook, where the first set of CCs for which the feedback is included is based on a frequency band associated with the indication in the capability information.

A non-transitory computer-readable medium storing code for wireless communication at a network entity is described. The code may include instructions executable by one or more processors to receive capability information that indicates a UE capability for processing of a PDSCH, where the capability information includes an indication that a UE is capable of monitoring for more than one downlink shared channel transmission within a slot per CC, transmit control information indicative of a codebook for HARQ-ACK at the UE, transmit one or more downlink shared channel transmissions over one or more CCs, and receive feedback for a first set of CCs which is at least a portion of the one or more CCs, the feedback included in the codebook, where the first set of CCs for which the feedback is included is based on a frequency band associated with the indication in the capability information.

In some examples of the method, network entities, and non-transitory computer-readable medium described herein, receiving the feedback may include operations, features, means, or instructions for receiving the feedback for candidate downlink shared channel occasions over the first set of CCs based of TDRA groups of non-overlapping SLIVs.

Some examples of the method, network entities, and non-transitory computer-readable medium described herein may further include operations, features, means, or instructions for determining the first set of CCs as all of the one or more CCs in a cell group based on the indication in the capability information that indicates that the UE may be capable of monitoring for the more than one downlink shared channel transmission within the slot for at least the frequency band in at least one frequency band combination.

Some examples of the method, network entities, and non-transitory computer-readable medium described herein may further include operations, features, means, or instructions for determining the first set of CCs as all of the one or more CCs in a cell group based on the indication in the capability information that indicates that the UE may be capable of monitoring for the more than one downlink shared channel transmission within the slot for at least the frequency band in at least one frequency band combination that includes the cell group.

Some examples of the method, network entities, and non-transitory computer-readable medium described herein may further include operations, features, means, or instructions for determining the first set of CCs as all of the one or more CCs in the frequency band based on the indication in the capability information that indicates that the UE may be capable of monitoring for the more than one downlink shared channel transmission within the slot for the frequency band in at least one frequency band combination.

Some examples of the method, network entities, and non-transitory computer-readable medium described herein may further include operations, features, means, or instructions for determining the first set of CCs as all of the one or more CCs in the frequency band based on the indication in the capability information that indicates that the UE may be capable of monitoring for the more than one downlink shared channel transmission within the slot for the frequency band in at least one frequency band combination, where the at least one frequency band combination corresponds to the one or more CCs in one or more frequency bands.

In some examples of the method, network entities, and non-transitory computer-readable medium described herein, receiving the feedback may include operations, features, means, or instructions for receiving the feedback for a single candidate downlink shared channel occasion over a second set of CCs without identifying TDRA groups of non-overlapping SLIVs.

In some examples of the method, network entities, and non-transitory computer-readable medium described herein, the UE capability for the processing of the PDSCH included in the capability information includes one or more of a first UE capability associated with a first processing capability, a second UE capability associated with a second processing capability applicable for a set of multiple sub-carrier spacings, and a limited second UE capability associated with the second processing capability applicable for a subset of the set of multiple sub-carrier spacings, in addition to a CBG processing capability, where the first processing capability and the second processing capability may be different.

Some examples of the method, network entities, and non-transitory computer-readable medium described herein may further include operations, features, means, or instructions for determining that the UE may be capable of monitoring for the more than one downlink shared channel transmission within the slot based on the indication being associated with the first UE capability without a CBG processing type being enabled.

Some examples of the method, network entities, and non-transitory computer-readable medium described herein may further include operations, features, means, or instructions for determining that the UE may be capable of monitoring for the more than one downlink shared channel transmission within the slot based on second control information that enables at least one of a second UE processing type or a limited second UE processing type for the UE.

Some examples of the method, network entities, and non-transitory computer-readable medium described herein may further include operations, features, means, or instructions for determining that the UE may be capable of monitoring for the more than one downlink shared channel transmission within the slot based on the indication being associated with the first UE capability and in an absence of the second UE processing type, the limited second UE processing type, and a CBG processing type being enabled.

Some examples of the method, network entities, and non-transitory computer-readable medium described herein may further include operations, features, means, or instructions for transmitting second control information that enables a CBG processing type for the UE and determining that the UE may be capable of monitoring for the more than one downlink shared channel transmission within the slot based on the indication being associated with the first UE capability and on the CBG processing type being enabled, and in an absence of the second UE processing type and the limited second UE processing type being enabled.

Some examples of the method, network entities, and non-transitory computer-readable medium described herein may further include operations, features, means, or instructions for transmitting second control information that enables a CBG processing type for the UE and enables at least one of the second UE processing type or the limited second UE processing type for the UE and determining that the UE may be capable of monitoring for the more than one downlink shared channel transmission within the slot based on the indication being associated with one of the second UE processing type or the limited second UE processing type and on the CBG processing type being enabled.

Some examples of the method, network entities, and non-transitory computer-readable medium described herein may further include operations, features, means, or instructions for transmitting second control information that enables at least one of the second UE processing type or the limited second UE processing type for the UE and determining that the UE may be capable of monitoring for the more than one downlink shared channel transmission within the slot based on the indication being associated with one of the second UE processing type or the limited second UE processing type, and in an absence of a CBG processing type being enabled.

Some examples of the method, network entities, and non-transitory computer-readable medium described herein may further include operations, features, means, or instructions for determining that the UE may be capable of monitoring for the more than one downlink shared channel transmission within the slot may be further based on at least one of the second UE processing type or the limited second UE processing type indicating that the UE may be capable of monitoring for the more than one downlink shared channel transmission within the slot.

A method for wireless communication at a network entity is described. The method may include transmitting control information indicative of a codebook for HARQ-ACK at a UE, where the control information includes a first parameter that disables or enables the UE to monitor for more than one downlink shared channel transmission per slot, transmitting one or more downlink shared channel transmissions, and receiving feedback for one or more CCs based on the first parameter, where the feedback is included in the codebook for the HARQ-ACK of the one or more downlink shared channel transmissions, and where the codebook is based on the control information.

An network entity for wireless communication is described. The network entity may include one or more memories storing processor-executable code and one or more processors coupled with the one or more memories and individually or collectively operable to execute the code to cause the UE to transmit control information indicative of a codebook for HARQ-ACK at a UE, where the control information includes a first parameter that disables or enables the UE to monitor for more than one downlink shared channel transmission per slot, transmit one or more downlink shared channel transmissions, and receive feedback for one or more CCs based on the first parameter, where the feedback is included in the codebook for the HARQ-ACK of the one or more downlink shared channel transmissions, and where the codebook is based on the control information.

Another network entity for wireless communication is described. The network entity may include means for transmitting control information indicative of a codebook for HARQ-ACK at a UE, where the control information includes a first parameter that disables or enables the UE to monitor for more than one downlink shared channel transmission per slot, means for transmitting one or more downlink shared channel transmissions, and means for receiving feedback for one or more CCs based on the first parameter, where the feedback is included in the codebook for the HARQ-ACK of the one or more downlink shared channel transmissions, and where the codebook is based on the control information.

A non-transitory computer-readable medium storing code for wireless communication at a network entity is described. The code may include instructions executable by one or more processors to transmit control information indicative of a codebook for HARQ-ACK at a UE, where the control information includes a first parameter that disables or enables the UE to monitor for more than one downlink shared channel transmission per slot, transmit one or more downlink shared channel transmissions, and receive feedback for one or more CCs based on the first parameter, where the feedback is included in the codebook for the HARQ-ACK of the one or more downlink shared channel transmissions, and where the codebook is based on the control information.

Some examples of the method, network entities, and non-transitory computer-readable medium described herein may further include operations, features, means, or instructions for receiving capability information that indicates a UE capability for processing of a PDSCH, where the capability information includes an indication of a quantity of downlink shared channel transmissions the UE may be capable of monitoring for within a slot.

In some examples of the method, network entities, and non-transitory computer-readable medium described herein, the first parameter enables the UE to monitor for the more than one downlink shared channel transmission per slot on a per CC basis, or on a per bandwidth part basis, or on a per cell group basis.

In some examples of the method, network entities, and non-transitory computer-readable medium described herein, transmitting the control information may include operations, features, means, or instructions for transmitting a second indication of a maximum quantity of downlink shared channel transmissions the UE may be capable of monitoring for within the slot.

Some examples of the method, network entities, and non-transitory computer-readable medium described herein may further include operations, features, means, or instructions for receiving a second UE capability for monitoring for the control information that includes the first parameter.

Some examples of the method, network entities, and non-transitory computer-readable medium described herein may further include operations, features, means, or instructions for transmitting second control information that includes a second parameter that enables the first parameter on a per cell group basis, where the first parameter may be on a per CC basis or on a per bandwidth part basis.

In some examples of the method, network entities, and non-transitory computer-readable medium described herein, transmitting the control information may include operations, features, means, or instructions for transmitting the first parameter, where the first parameter enables the UE to monitor for more than one downlink shared channel transmissions per slot or disables the UE to monitor for a single downlink shared channel transmission per slot.

In some examples of the method, network entities, and non-transitory computer-readable medium described herein, transmitting the control information may include operations, features, means, or instructions for transmitting the first parameter, where the first parameter enables the UE to monitor for a single downlink shared channel transmission per slot or disables the UE to monitor for more than one downlink shared channel transmissions per slot.

DETAILED DESCRIPTION

Figure 1:
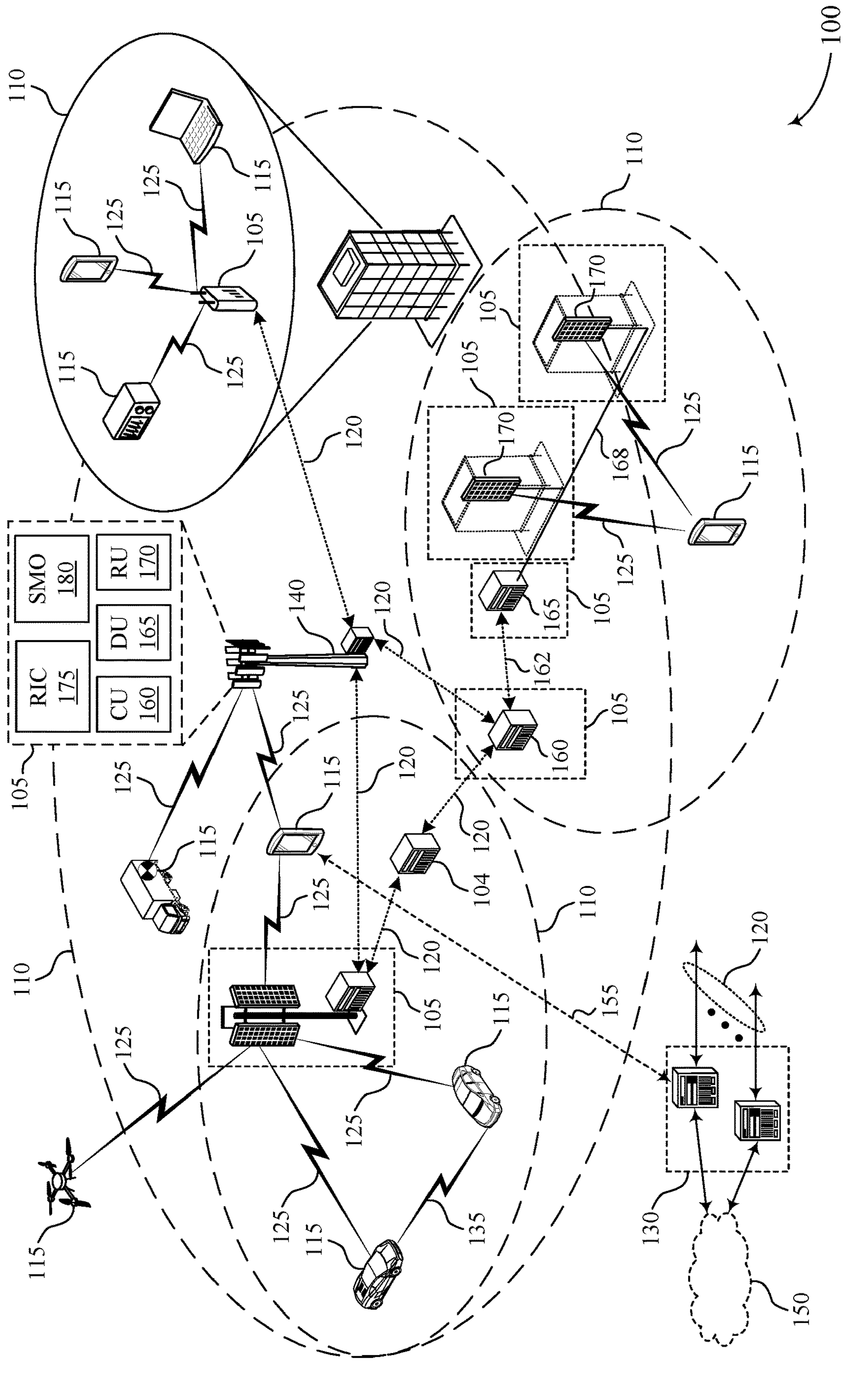
FIG. 1 illustrates an example of a wireless communications system that supports type 1 hybrid automatic repeat request (HARQ) acknowledgment (ACK) codebook generation in accordance with one or more aspects of the present disclosure.

In some examples, a user equipment (UE) may generate a feedback codebook based on semi-statically received configuration information, which may be based on different capabilities of the UE. That is, the UE may report one or more different capabilities that each identify a quantity of physical downlink shared channel (PDSCH) occasions that the UE may be capable of monitoring for or receiving in a given slot on a component carrier (CC) for a corresponding feature set. For example, the UE may report a capability to monitor for (and receive) a first quantity of PDSCH occasions under a Type 1 processing condition (e.g., processing capability), a second quantity of PDSCH occasions under a Type 2 processing condition, a third quantity of PDSCH occasions under a Type 1 processing condition that is code block group (CBG)-enabled, and a fourth quantity of PDSCH occasions under a Type 2 processing condition that is CBG-enabled. Each of these quantities may be different, and as such, a network entity may enable particular configuration information for the UE to generate the feedback codebook based on the different capabilities.

However, there may be ambiguity in generating the feedback codebook when the network entity enables multiple different configurations. For example, in determining the feedback codebook, the UE may provide feedback for each PDSCH occasion, or if multiple occasions overlap, the UE may provide the feedback for each time domain resource allocation (TDRA) group, where a TDRA group may include a unique set of overlapping start and length indicator values (SLIVs). When the network entity enables the UE with different configurations, each corresponding to different capabilities for reception of PDSCH transmissions within a slot (e.g., different quantities of PDSCH transmissions per slot), the UE may require additional information to determine how large the feedback codebook may be and which TDRA groups the UE may consider for inclusion in the feedback codebook. Moreover, the network entity may lack support for some capabilities for PDSCH reception of the UE, which may limit the feedback codebook or decrease resource usage efficiency.

The techniques described herein support rules and signaling for determining which UE capabilities and codebook configurations to consider when generating a feedback codebook for PDSCH transmissions. Using a rules-based technique, the UE may transmit capability information to a network entity that indicates a UE capability for processing PDSCH transmissions, and an indication that the UE is capable of monitoring for more than one PDSCH transmission per slot, per CC. A network entity may enable the UE with one or more configurations, each associated with the reported UE capabilities. As the UE capabilities each identify a quantity of PDSCH occasions the UE is capable of monitoring for within a slot, the configurations may also be based on the different quantities of PDSCH occasions. The UE may generate the feedback codebook (e.g., a Type 1 hybrid automatic repeat request (HARQ) acknowledgment (ACK) codebook) for the PDSCH transmissions based on the UE capability and a configuration, where the codebook includes feedback for a set of component carries based on a frequency band associated with the configuration. That is, the rules may specify which CCs the UE is to consider for determining the TDRA groups of non-overlapping SLIVs, in view of the different capabilities reported by the UE.

Alternatively, the network entity may transmit control information including a radio resource control (RRC) parameter indicating a quantity of PDSCH occasions the UE is to monitor per slot. The UE may transmit capability information to a network entity that indicates a UE capability for processing PDSCH transmissions, and an indication that the UE is capable of monitoring for a quantity of (e.g., one or more) PDSCH transmissions per slot, per CC. Instead of providing different feedback codebook configurations to the UE based on different UE capabilities, or in addition to, the network entity may transmit the control information including the RRC parameter, where the RRC parameter may enable or disable the UE to monitor for more than one PDSCH per slot. In some examples, the parameter may indicate the quantity of PDSCHs the UE is to monitor for. As such, the UE may generate the feedback codebook based on the control information, the codebook including feedback for one or more CCs based on the information in the RRC parameter.

Aspects of the disclosure are initially described in the context of wireless communications systems. Aspects of the disclosure are then described in the context of frame formats and process flows. Aspects of the disclosure are further illustrated by and described with reference to apparatus diagrams, system diagrams, and flowcharts that relate to type 1 HARQ-ACK codebook generation.

FIG. 1 illustrates an example of a wireless communications system 100 that supports type 1 HARQ-ACK codebook generation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support type 1 HARQ-ACK codebook generation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may determine a Type 1 HARQ-ACK codebook (e.g., a semi-static HARQ-ACK codebook) based on semi-static information, for example, candidate PDSCH occasions. A candidate PDSCH occasion corresponds to an occasion during which the UE 115 may receive a PDSCH transmission. In some cases, the UE 115 may determine a set of PDSCH occasions for the codebook on a per-downlink serving cell basis based on several factors. In some examples, the set of PDSCH occasions may be based on a set of configured K1 values, which may be a set of possible slot timing offset values (e.g., offset between PDSCH and HARQ-ACK transmission) that may be indicated by downlink control information (DCI). For example, a set of K1 values may be {1, 2, 3, 4, 5, 6, 7, 8} if DCI format 1_0 is configured and DCI format 1_1 is not configured in a serving cell. If DCI format 1_1 or 1_2 is configured for the serving cell, then K1 may be provided by dl-DataToUL-ACK in an RRC configuration.

Additionally, for each K1 value, the UE 115 may determine a set of PDSCH TDRA candidates (e.g., corresponding to a SLIV within a slot). In some examples, TDRA candidates that overlap with semi-static uplink symbols may be removed as the UE 115 may be unable to monitor for a PDSCH corresponding to an overlapping TDRA occasion or a corresponding SLIV, and remaining TDRA candidates (e.g., a row) may be grouped such that a quantity of groups is equal to a maximum quantity of non-overlapping SLIVs in the slot and a quantity of bits the HARQ-ACK codebook requires for that K1 value.

In some examples, HARQ-ACK codebook determination may be a two-step process including first determining a set of PDSCH occasions as described herein, and then determining the HARQ-ACK codebook based on the set of PDSCH occasions. A type 1 HARQ-ACK codebook may accommodate as many bits as potential PDSCH receptions. For example, if a TDRA includes SLIVs for non-overlapping symbols {0, 1}, {2, 3}, {4, 5}, . . . , {12, 13}, there may be 7 bits per K1 value per CC. That is, if K1={1, 2, 3}, there may be 7*3=21 bits per CC for FDD, and slightly fewer bits for TDD depending on how many SLIVs overlap with uplink symbols per slot. That is, per slot and per K1 value, the UE 115 may identify any SLIVs that are overlapping with uplink symbols and perform TDRA grouping after removing the overlapping SLIVs (e.g., the UE 115 performs TDRA grouping only for the SLIVs that are non-overlapping with semi-static uplink symbols).

One exception to this process of determining a HARQ-ACK codebook based on PDSCH occasions may occur if the UE 115 fails to indicate a capability to monitor for more than one PDSCH per slot. In such cases, there may be one bit per slot per K1 values. As such, the UE 115 may refrain from performing TDRA grouping, and a size of the HARQ-ACK codebook may be independent of a maximum quantity of non-overlapping SLIVs corresponding to different TDRA rows within a slot. Otherwise, the UE's capability regarding a maximum quantity of PDSCHs per slot may not be considered, and instead the UE 115 may consider a maximum quantity of non-overlapping SLIVs in a set of TDRA rows or candidates in a slot to determine the HARQ-ACK codebook. That is, if there is more than one bit per slot per K1 value, the UE 115 may determine a size (e.g., a quantity of bits) of a HARQ-ACK codebook based on the maximum quantity of non-overlapping SLIVs in a set of TDRA rows or candidates in a slot.

For each K1 value, if the UE 115 fails to indicate a capability to monitor for more than one unicast PDSCH or multicast PDSCH per slot, and if a set of SLIVs corresponding to TDRA rows is nonzero, the UE 115 may add one place in a codebook for each PDSCH (e.g., $M_{A,c}=M_{A,c} \cup j$, where $M_{A,c}$ may represent a set of occasions for candidate PDSCH receptions for serving cell c and j may represent an index of occasion for candidate PDSCH reception). As such, there may be one bit (e.g., to support one PDSCH) per slot based on the UE 115 failing to indicate its capability. Otherwise (e.g., else), the UE 115 may perform TDRA grouping to identify a maximum quantity of non-overlapping SLIVs in a slot. Then, each TDRA group may add one place (j) to the set of occasions for candidate PDSCH receptions ($M_{A,c}$). That is, there may be more than one bits per slot based on a quantity of non-overlapping SLIVs.

In some examples, whether the UE 115 fails to indicate a capability to monitor for more than one PDSCH per slot may be a condition that is neither well-defined nor controllable by a network entity 105. In some cases, it may be unclear whether the condition may be applied per CC, per frequency band, or per cell-group, and based on which UE capability the condition may be defined. For example, there may be multiple UE capabilities that indicate more than one PDSCH per slot (e.g., up to 2, up to 4, up to 7), including UE capabilities for PDSCH processing Type 1 (e.g., a regular timeline, pdsch-ProcessingType1-DifferentTB-PerSlot), PDSCH processing Type 2 (e.g., a fast timeline, pdsch-Processing Type2), PDSCH processing Type 2 with a scheduling limitation (e.g., pdsch-Processing Type2-Limited), (CBG)-based PDSCH reception for PDSCH processing Type 1 (e.g., cbgPDSCH-ProcessingType1-DifferentTB-PerSlot), or CBG-based PDSCH reception for PDSCH processing Type 2 (e.g., cbgPDSCH-ProcessingType2-DifferentTB-PerSlot), among other UE capabilities. Such UE capabilities may be indicated per feature set, such that a granularity of UE capability signaling may be per-band, per-band combination. As such, the UE 115 may fail to specify for which UE capability the condition regarding the more than one PDSCH per slot applies to.

In some examples, for the PDSCH processing Type 1 and a non-CBG capability, the UE 115 may indicate support of two PDSCHs per slot for band 1 in a band combination {band 1, band 2}. In addition, the UE 115 may separately indicate support of two PDSCHs per slot for band 2 in the band combination {band 1, band 2}(e.g., not for both bands in the band combination at the same time). A network entity 105 may configure a CC 1 in band 1 and a CC 2 in band 2, where a configured TDRA for both bands include more than one non-overlapping SLIVs. Additionally, the network entity 105 may schedule more than one PDSCH per slot in one of the two CCs, but not in both. The UE 115 may be uninformed, based on RRC configurations, which CC may be scheduled with more than one PDSCH per slot, which may impact Type 1 HARQ-ACK codebook construction and result in codebook size mismatch. This issue may occur if a UE capability is on a per-band, per-band combination basis and a functionality depends on this UE capability without an RRC parameter that may be configured by the network entity 105. That is, it may be unclear whether the UE 115 is to support one or more than one PDSCH per slot in either band.

In some other examples, the UE 115 may indicate support for 7 PDSCHs per slot for UE processing capability Type 1, 1 PDSCH per slot for a CBG-based PDSCH capability or for UE processing capability Type 2, and 2 PDSCHs per slot for UE processing capability Type 2 with scheduling limitations. In such cases, it may be unclear whether the UE 115 is to consider network-configured RRC parameters related to CBG-based PDSCH (e.g., PDSCH-CodeBlockGroupTransmission), the UE processing capability Type 2 (e.g., processingType2 Enabled), or both to know which UE capability is to be considered to know whether the condition is applied or not. Moreover, the RRC parameter processingType2Enabled may fail to distinguish between the UE processing capability Type 2 and the UE processing capability Type 2 with a scheduling limitation.

Additionally, or alternatively, the UE 115 supports a capability to monitor for more than one PDSCH per slot, the network entity 105 may prefer not to use the capability or may lack a corresponding capability. For example, the UE 115 may support 7 PDSCHs per slot for both band 1 and band 2 in band combination {band 1, band 2}, and the network entity 105 may configure two CCs in band 1 and three CCs in band 2. The network entity 105 may still intend to send up to one PDSCH per slot. For example, the network entity 105 may intend to transmit one PDSCH per slot in all CCs in band 1 and in band 2, in all CCs in band 1 but not in any CCs in band 2, or in some but not all CCs of band 1. A configured TDRA for each of the five CCs may include 7 non-overlapping SLIVs, however the 7 non-overlapping SLIVs may not be based on sending 7 PDSCHs per slot for the UE 115. Instead, the 7 non-overlapping SLIVs may provide flexibility to dynamically TDM different UEs 115 in different symbols of the slot. In this way, the Type 1 HARQ-ACK codebook may have 35 bits (e.g., 7*5 bits) per PDSCH slot across all CCs for the UE 115. However, for some of the CCs, only one bit per PDSCH slot may be sufficient.

To resolve the issues relating to the poorly defined condition of the UE 115 indicating its capability to monitor for more than one PDSCH per slot and the lack of a corresponding capability at the network entity 105, the wireless communications system 100 may support techniques to clarify how the condition is to be interpreted based on indicated UE capabilities or to use a new RRC configuration to indicate the condition without being defined with respect to the UE capabilities. Using a rules-based approach, the UE 115 may transmit capability information indicating a UE capability for processing a PDSCH transmission (e.g., a processing or CBG-based capability) and indicating that the UE 115 is capable of monitoring for more than one PDSCH per slot, per CC. The network entity 105 may enable the UE 115 with a feedback codebook configuration based on the capability information, such that the UE 115 may generate the feedback codebook (e.g., a Type 1 HARQ-ACK codebook) for one or more PDSCH transmissions based on the configuration. The codebook may include feedback for a set of CCs based on a frequency band associated with the UE capability to monitor for more than one PDSCH per slot, per CC. The codebook may include the feedback based on TDRA grouping of non-overlapping SLIVs.

Alternatively, the capability information may indicate the UE capability and that the UE 115 is capable of monitoring for some quantity of PDSCH transmissions within a slot. That is, the capability information may lack an explicit indication of a quantity of PDSCH transmissions the UE 115 may receive within a slot per CC. The network entity 105 may transmit control information indicating a feedback codebook configuration and a parameter (e.g., an RRC parameter) that enables or disables the UE 115 to monitor for more than one PDSCH transmissions per slot. Based on the parameter, the UE 115 may generate the feedback codebook that includes feedback for one or more CCs, the feedback based on the quantity of PDSCH transmissions the network entity 105 may enable the UE 115 to monitor for per slot.

Figure 2:
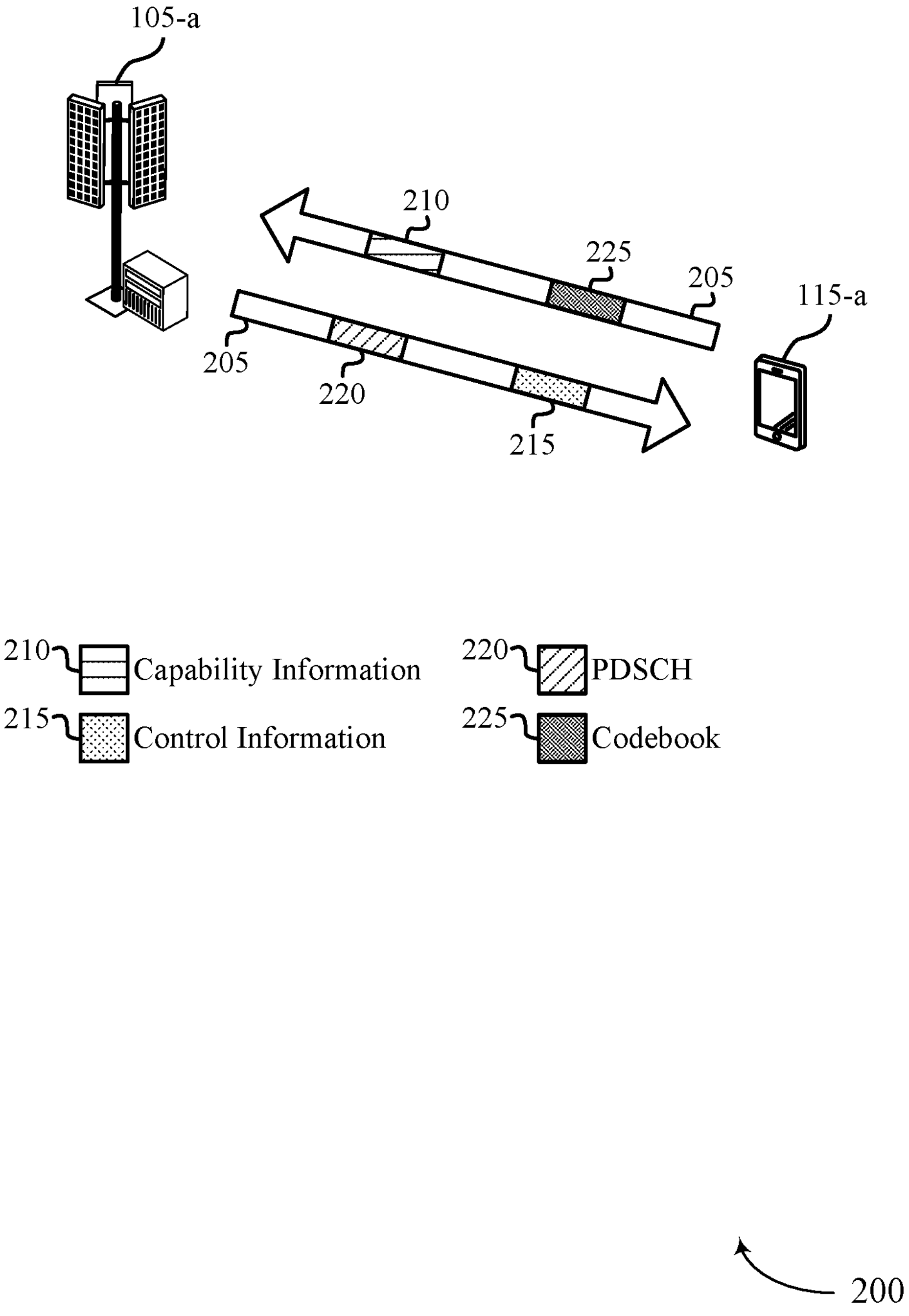
FIG. 2 illustrates an example of a wireless communications system that supports type 1 HARQ-ACK capability in accordance with one or more aspects of the present disclosure.

FIG. 2 illustrates an example of a wireless communications system 200 that supports type 1 HARQ-ACK codebook generation in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices described herein. The UE 115-*a* and the network entity 105-*a* may support the generation of Type 1 HARQ-ACK codebooks, which may be based on one or more capabilities of the UE 115-*a* for processing physical uplink shared channel (PUSCH) transmissions and corresponding feedback codebook configurations enabled for the UE 115-*a* by the network entity 105-*a*.

The wireless communications system 200 may support communications between the UE 115-*a* and the network entity 105-*a*. For example, the UE 115-*a* and the network entity 105-*a* may perform uplink and downlink communications via respective communications links 205, which may be examples of communications links 125 described herein with reference to FIG. 1. In some examples, the UE 115-*a* may transmit capability information 210 indicating a UE capability for processing a PDSCH. The UE capability may include one or more of a first UE capability associated with a first processing capability (e.g., pdsch-ProcessingType1-DifferentTB-PerSlot), a second UE capability associated with a second processing capability applicable for a set of multiple sub-carrier spacings (e.g., pdsch-Processing Type2), a limited second UE capability associated with the second processing capability applicable for a subset of the plurality of sub-carrier spacings (e.g., pdsch-Processing Type2-Limited), a CBG processing capability associated with the first processing capability (e.g., cbgPDSCH-ProcessingType1-DifferentTB-PerSlot-r16), or a CBG processing capability associated with the second processing capability (e.g., cbgPDSCH-ProcessingType2-DifferentTB-PerSlot-r16). The first processing capability and the second processing capability may be different.

For example, the first processing capability may define whether the UE is capable of monitoring for up to two, four, or seven unicast PDSCHs for several transport blocks with PDSCH scrambled using C-RNTI, TC-RNTI or CS-RNTI in one serving cell with a same slot per CC that are multiplexed in the time domain. The second processing capability may indicate a UE capability of receiving 1, 2, 4, or 7 unicast PDSCHs for different transport blocks per slot, per CC for a set of sub-carrier spacings. The limited second processing capability may indicate that a UE capability of receiving 1, 2, 4, or 7 unicast PDSCHs for different transport blocks per slot, per CC for a limitation of a sub-carrier spacing of 30 kHz in the presence of scheduling limitations (e.g., with respect to a maximum quantity of resource blocks). In addition, the CBG processing capabilities associated with the first and second processing capabilities may indicate that the UE supports CBG-based reception with 1, 2, 4, or 7 unicast PDSCHs per slot, per CC. In addition to the UE capability for the processing of the PDSCH, the capability information 210 may include an indication that the UE 115-*a* is capable of monitoring for more than one PDSCH transmission within a slot per CC.

The UE 115-*a* may receive control information 215 indicative of the codebook 225 for HARQ-ACK at the UE 115-*a* (e.g., a Type 1 HARQ-ACK codebook). After monitoring for one or more PDSCH transmissions 220 from the network entity 105-*a*, the UE 115-*a* may generate the codebook 225 for the PDSCH transmissions 220 based on the control information 215. That is, the UE 115-*a* may generate the codebook 225 in accordance with the capability of the UE 115-*a* to monitor for (and receive) more than one PDSCH within a slot per CC and a feedback codebook configuration enabled by the network entity 105-*a*. In some examples, the codebook 225 may include feedback (e.g., HARQ-ACK feedback) for a first set of CCs based on a frequency band associated with the indication that the UE 115-*a* is capable of monitoring for more than one PDSCH transmission 220 within the slot per CC. That is, based on the indication in the capability information 210, the UE 115-*a* may perform TDRA grouping based on non-overlapping SLIVs for determining a quantity of PDSCH occasions to include in a codebook 225 (e.g., a Type 1 HARQ-ACK codebook).

In some examples, the UE 115-*a* may determine the first set of CCs of the one or more CCs in which the UE 115-*a* monitors for the PDSCH transmissions 220 based on the indication in the capability information 210. For example, the codebook 225 may include feedback for all configured CCs in a cell group if the UE 115-*a* indicates a capability to monitor for more than one PDSCH per slot for at least one frequency band in at least one frequency band combination (e.g., a band 1 in a band combination {band 1, band 2}). Alternatively, the codebook 225 may include feedback for all configured CCs in a cell group of the UE 115-*a* indicates the capability to monitor for more than one PDSCH per slot for at least one frequency band in a band combination that includes the cell group. In these cases, the first set of CCs may include all of the one or more CCs in a cell group in which the UE 115-*a* monitors for the PDSCH transmissions 220 for any UE capability for processing the PDSCH transmissions 220.

In some other examples, the codebook 225 may include feedback for all configured CCs in a frequency band if the UE 115-*a* indicates a capability to monitor for more than one PDSCH per slot for the frequency band in at least one frequency band combination. Alternatively, the codebook 225 may include feedback for all configured CCs in a frequency band if the UE 115-*a* indicates the capability to monitor for more than one PDSCH per slot for the frequency band in a frequency band combination that is consistent with the configured CCs across all frequency bands. That is, the frequency band combination may correspond to the one or more CCs in one or more frequency bands. In such cases, the UE 115-*a* may determine the first set of CCs as all of the one or more CCs in the frequency band for any UE capability for processing the PDSCH transmissions 220.

In some cases, different UE capabilities and control information 215 may result in different first sets of CCs for inclusion in the feedback of the codebook 225 based on the TDRA grouping of non-overlapping SLIVs. For example, the UE 115-*a* may indicate (e.g., in the capability information 210) support for receiving two PDSCHs transmissions 220 per slot for band 1 in a band combination {band 1, band 2}. The control information 215 (e.g., an RRC configuration) may indicate a CC1 in band 1 and a CC2 in band 2. Accordingly, if the UE 115-*a* includes feedback for all CCs in a cell group based on the UE 115-*a* indicating a capability to monitor for more than one PDSCH per slot for at least one band in at least one band combination (e.g., Option 1) or a capability to monitor for more than one PDSCH per slot for at least one band in a band combination that includes the cell group of the CCs (e.g., Option 2), the UE 115-*a* may include the feedback for both CC1 and CC2. Alternatively, if the UE 115-*a* includes feedback for all CCs in a band based on the UE 115-*a* indicating a capability to monitor for more than one PDSCH per slot for the band in at least one band combination (e.g., Option 3) or a capability to monitor for more than one PDSCH per slot for the band in at least one band combination that is consistent with the CCs across all bands (e.g., Option 4), the UE 115-*a* may include the feedback for only CC1 (because the capability information 210 only indicated support for the CCs in the same supported band).

In some other examples, the UE 115-*a* may indicate (e.g., in the capability information 210) support for receiving two PDSCHs transmissions 220 per slot for band 1 in a band combination {band 1, band 2}. The control information 215 (e.g., an RRC configuration) may indicate a CC1 in band 1 and a CC2 in band 3 (e.g., where band 3 is outside of the band combination). As such, the UE 115-*a* may support a capability for monitoring for more than one PDSCH transmissions 220 per slot for the band combination {band 1, band 2}but not for the band combination {band 1, band 3}. Accordingly, if the UE 115-*a* includes feedback for all CCs in a cell group based on the UE 115-*a* indicating a capability to monitor for more than one PDSCH per slot for at least one band in at least one band combination (e.g., Option 1), then the UE 115-*a* may include feedback for both CC1 and CC2. If the UE 115-*a* includes feedback for all CCs in the cell group based on the UE 115-*a* indicating a capability to monitor for more than one PDSCH per slot for at least one band in a band combination that includes the cell group of the CCs (e.g., Option 2) or a capability to monitor for more than one PDSCH per slot for the band in at least one band combination that is consistent with the CCs across all bands (e.g., Option 4), the UE 115-*a* may not include feedback for CC1 or CC2 as the band combination is required to correspond to the cell group in such cases. If the UE 115-*a* includes feedback for all CCs in a band based on the UE 115-*a* indicating a capability to monitor for more than one PDSCH per slot for the band in at least one band combination (e.g., Option 3), the UE 115-*a* may include the feedback for only CC1 or the UE 115-*a* may include the feedback for only CC1.

In some other examples, the UE 115-*a* may indicate (e.g., in the capability information 210) support for receiving two PDSCH transmissions per slot for band 1 and band 2 in a band combination {band 1, band 2}. The UE 115-*a* may indicate this support as separate instances of feature sets (e.g., separate indications of support for band 1 and the band 2 in the band combination {band 1, band 2}). The control information 215 (e.g., an RRC configuration) may indicate a CC1 in band 1 and a CC2 in band 2. Accordingly, if the UE 115-*a* includes feedback for all CCs in a cell group based on the UE 115-*a* indicating a capability to monitor for more than one PDSCH per slot for at least one band in at least one band combination (e.g., Option 1), at least one band in a band combination that includes the cell group of the CCs (e.g., Option 2), a band in at least one band combination (e.g., Option 3), or a band in at least one band combination that is consistent with the CCs across all bands (e.g., Option 4), then the UE 115-*a* may include the feedback for both CC1 and CC2. In such cases, the UE 115-*a* may perform TDRA grouping for CC1 and CC2.

Additionally, or alternatively, the codebook 225 may include feedback for a second set of CCs, where only one candidate PDSCH occasion per slot may be considered in the codebook for each of the CCs in the second set based on the UE 115-*a* refraining from performing TDRA grouping of non-overlapping SLIVs. This may occur if the UE 115-*a* fails to indicate a capability to monitor for more than one PDSCH transmission 220 per slot. In such cases, the codebook 225 may include feedback for a single candidate PDSCH occasion over the second set of CCs without identifying TDRA groups of non-overlapping SLIVs. Hence, the second set of CCs may include the CCs that are not included in the first set of CCs (e.g., the second set may be a complement of the first set). Alternatively, the first set of CCs may include the CCs that are not included in the second set of CCs (e.g., the first set may be a complement of the second set).

In some cases, the UE's support for receiving more than one PDSCH per slot may be determined based on the UE capability indicated in the capability information 210. For example, the capability may be determined based on a capability for PDSCH processing Type 1 and non-CBG-based PDSCH capabilities. That is, the UE 115-*a* may use the first UE capability associated with the first processing capability (e.g., pdsch-ProcessingType1-DifferentTB-PerSlot) for receiving more than one PDSCH per slot for a CC, even if a second UE processing type (e.g., PDSCH processing Type 2) or a CBG processing type are configured for the CC. The UE 115-*a* may determine that it is capable of monitoring for the more than one PDSCH transmission 220 within the slot based on the indication in the capability information 210 being associated with the first UE capability without the CBG processing type being enabled for the UE 115-*a*. That is, the first UE capability may not be associated with a CBG processing type, and the UE 115-*a* may use the first UE capability for the purpose of Type 1 HARQ-ACK codebook generation (irrespective of an RRC configurations from the network entity 105-*a* that enable Type 2 processing or CBG-based PDSCH), and the UE 115-*a* may continue to follow CBG-based procedures if a CBG capability is configured for other purposes.

Alternatively, the UE 115-*a* may determine which UE capability to apply to receiving more than one PDSCH transmission 220 within a slot based on whether the second UE capability, the limited second UE capability, the CBG processing capability, or a combination thereof are configured for a given CC. That is, the UE 115-*a* may determine that the UE 115-*a* is capable of monitoring for the more than one PDSCH transmission 220 within the slot (or may determine that the UE 115-*a* is not capable of monitoring for the more than one PDSCH transmission 220 within the slot) based on receiving second control information (e.g., RRC signaling) from the network entity 105-*a* that enables at least one of the second UE capability or the limited second UE capability for the UE 115-*a*, enables CBG-based PDSCH reception, or a combination thereof.

In some examples, if s CBG processing type (e.g., PDSCH-CodeBlockGroupTransmission) and a second UE processing type (e.g., processingType2Enabled) are not configured for the UE 115-*a*, then the UE 115-*a* may use the first UE capability (e.g., pdsch-ProcessingType1-DifferentTB-PerSlot) for receiving more than one PDSCH transmission 220 within the slot. That is, the UE 115-*a* may determine that it is capable of monitoring for the more than one PDSCH transmission 220 within the slot based on the indication in the capability information 210 being associated with the first UE capability and in an absence of the second UE processing type, the limited second UE processing type and the CBG processing type being enabled.

Alternatively, if the CBG processing type (e.g., PDSCH-CodeBlockGroupTransmission) is configured and the second UE processing type (e.g., processingType2Enabled) is not configured for the UE 115-*a*, the UE 115-*a* may use the CBG processing type (e.g., cbgPDSCH-ProcessingType1-DifferentTB-PerSlot-r16) for receiving more than one PDSCH transmission 220 within the slot. In such cases, the UE 115-*a* may receive second control information (e.g., RRC signaling) from the network entity 105-*a* that enables the CBG processing type for the UE 115-*a*. The UE 115-*a* may determine that it is capable of monitoring for the one or more PDSCH transmissions 220 within the slot based on the indication in the capability information 210 being associated with the first UE capability and one the CBG processing type being enabled, and in the absence of the second UE processing type and the limited second UE processing type being enabled.

If both of the CBG processing type (e.g., PDSCH-CodeBlockGroupTransmission) and the second UE processing type (e.g., processingType2Enabled) are configured for the UE 115-*a*, the UE 115-*a* may use the second UE capability for the limited second UE capability for monitoring for more than one PDSCH transmission 220 within the slot. In such cases, the UE 115-*a* may receive the second control information (e.g., RRC signaling) that enables the CBG processing type for the UE 115-*a* and enables at least one of the second UE processing type or the limited second UE processing type for the UE 115-*a*. The UE 115-*a* may determine that it is capable of monitoring for the more than one PDSCH transmission 220 within the slot based on the indication in the capability information 210 being associated with one of the second UE processing type or the limited second UE processing type and on the CBG processing type being enabled.

If the CBG processing type (e.g., PDSCH-CodeBlockGroupTransmission) is not configured and the second UE processing type (e.g., processingType2Enabled) or the limited second UE processing type (e.g., pdsch-Processing Type2-Limited) is configured for the UE 115-*a*, the UE 115-*a* may use the second UE capability or the limited second UE capability to monitor for more than one PDSCH transmission 220 within the slot. That is, the UE 115-*a* may receive the second control information (e.g., RRC signaling) that enables at least one of the second UE processing type or the limited second UE processing type for the UE 115-*a*. The UE 115-*a* may determine that it is capable of monitoring for the more than one PDSCH transmission 220 within the slot based on the indication in the capability information 210 being associated with one of the second UE processing type or the limited second UE processing type and in an absence of the CBG processing type being enabled. In some cases, if the UE 115-*a* indicates both the second UE processing type and the limited second UE processing type, the UE 115-*a* may use the corresponding capability that is associated with a larger quantity of PDSCH transmissions 220 per slot (e.g., the UE 115-*a* may perform TDRA grouping if the UE 115-*a* indicated more than one PDSCH per slot in at least one of the two second UE capabilities). That is, the second UE capability or the limited second UE capability may indicate that the UE 115-*a* is capable of monitoring for the more than one PDSCH transmission 220 within the slot.

In some examples, the indication that the UE 115-*a* supports more than one PDSCH transmission 220 per slot may be ambiguous (e.g., regarding which UE capability applies to the condition). In such cases, the network entity 105-*a* may use an RRC configuration to enable or disable the UE 115-*a* to monitor for more than one PDSCH transmission 220 per slot. The UE 115-*a* may receive the control information 215 indicating the codebook 225. In addition, the codebook 225 may include a first parameter (e.g., an RRC parameter) that enables or disables the UE 115-*a* to monitor for the more than one PDSCH transmission 220 per slot. In some examples, the network entity 105-*a* may indicate the first parameter per serving cell (e.g., per CC), per BWP, or per cell group, which may enable the UE 115-*a* to monitor for the more than one PDSCH transmission 220 per slot on a per-CC basis, a per-BWP basis, or a per-cell group basis.

In some examples, the first parameter may configure (e.g., enable, disable) whether the UE 115-*a* may monitor for more than one PDSCH transmission 220 per slot (e.g., if the network entity 105-*a* configures the first parameter the UE 115-*a* may receive more than one PDSCH transmission 220 and if the network entity 105-*a* refrains from configuring the first parameter the UE 115-*a* may fail to monitor for more than one PDSCH transmission 220). In this way, the condition regarding whether the UE 115-*a* indicates the capability to monitor for more than one PDSCH per slot may be replaced with a condition regarding whether the UE 115-*a* is provided with the first parameter (e.g., a higher-layer parameter X) for the purposes of generating the codebook 225. Alternatively, the first parameter may indicate a maximum quantity of PDSCH transmissions 220 that the UE 115-*a* may be capable of monitoring for within the slot.

In some examples, the UE 115-*a* may indicate a capability to monitor for some quantity of PDSCH transmissions 220 within a slot. For example, instead of indicating that the UE 115-*a* is capable of monitoring for more than one PDSCH transmissions 220 within a slot per CC, the capability information 210 may indicate a quantity of PDSCH transmissions 220 the UE 115-*a* is capable of monitoring for within the slot. After monitoring for one or more PDSCH transmissions 220 form the network entity 105-*a* based on the control information 215, and based on the capability information 210 and the first parameter, the UE 115-*a* may generate the codebook 225 (e.g., a Type 1 HARQ-ACK codebook) for the PDSCH transmissions 220. The codebook 225 may include feedback for one or more CCs based on the first parameter. For example, if the first parameter enables the UE 115-*a* to monitor for more than one PDSCH transmission 220 per slot, the codebook 225 may include the feedback for a set of CCs.

In some examples, the UE 115-*a* may indicate a separate UE capability indicating that the UE 115-*a* supports the first parameter. For example, the UE 115-*a* may transmit a second UE capability for monitoring for the control information 215 that includes the first parameter. In this way, the network entity 105-*a* may transmit the control information 215 indicating the first parameter if the UE 115-*a* transmits the second UE capability. If the UE 115-*a* refrains from indicating the second UE capability, the UE 115-*a* may generate the codebook 225 based on supporting a capability to monitor for more than one PDSCH transmission 220 within a slot, per CC.

In addition, to ensure that the UE 115-*a* and the network entity 105-*a* both understand whether the first parameter is configured, the network entity 105-*a* may transmit a second parameter (e.g., a second RRC parameter) that enables the UE 115-*a* and the network entity 105-*a* to utilize the first parameter. In some examples, the network entity 105-*a* may configure the second parameter per cell group and the first parameter per CC or per BWP. That is, the UE 115-*a* may receive second control information from the network entity 105-*a* that includes the second parameter, the second parameter enabling the first parameter on a per-cell group basis, where the first parameter is on a per-CC basis or on a per-BWP basis. In such cases, the UE 115-*a* may determine the codebook 225 in accordance with the first parameter.

Alternatively, the first parameter may explicitly configure whether the UE 115-*a* is to monitor for one or more PDSCH transmissions 220 per slot, which may ensure that the UE 115-*a* and the network entity 105-*a* both understand how many PDSCH transmissions 220 the UE 115-*a* may receive per slot. For example, the first parameter may include an explicit {ON, OFF} configuration (indicating that the UE capability of receiving more than one PDSCH transmission 220 within the slot is on or off) or an explicit {single-PDSCH, multi-PDSCH} configuration (indicating that the UE is to monitor for a single PDSCH transmission 220 or multiple PDSCH transmissions 220 within the slot). For example, the first parameter may explicitly configure and enable a multi-PDSCH capability per slot or disable a single-PDSCH capability per slot. In such cases, the UE 115-*a* may perform TDRA grouping based on non-overlapping SLIVs for determining candidate PDSCH, and enable a single-PDSCH capability per slot or disable a multi-PDSCH capability per slot. In such cases, the UE 115-*a* may refrain from performing the TDRA grouping based on the non-overlapping SLIVs and may consider only one bit per slot (per K1 value) when generating the codebook 225.

Figure 3:
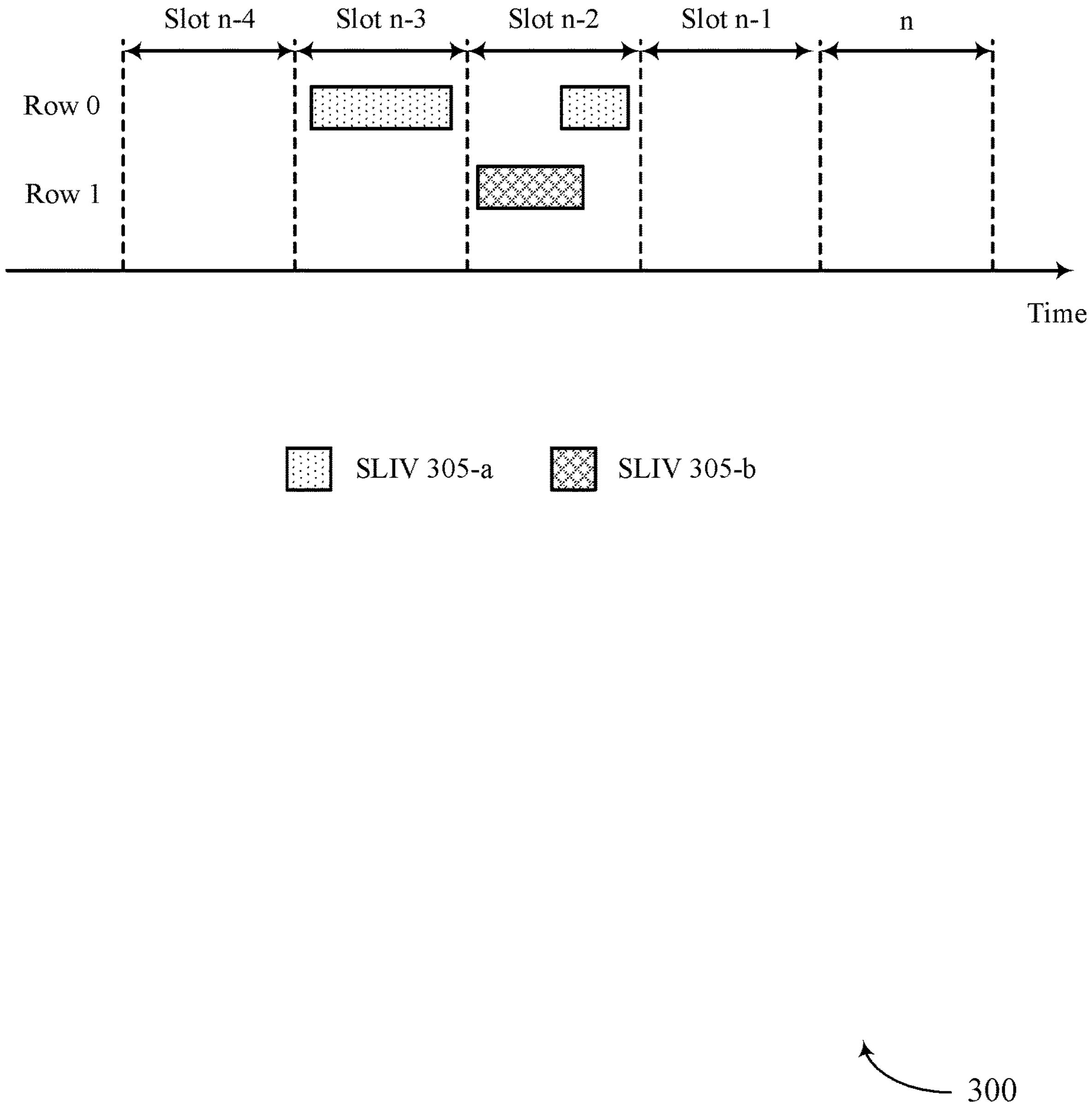
FIG. 3 illustrates an example of a frame format that supports type 1 HARQ-ACK codebook generation in accordance with one or more aspects of the present disclosure.

FIG. 3 illustrates an example of a frame format 300 that supports type 1 HARQ-ACK codebook generation in accordance with one or more aspects of the present disclosure. In some examples, the frame format 300 may be implemented by wireless communications system 100 and 200. For example, the frame format 300 may be implemented by a UE 115 and a network entity 105 as described with reference to FIGS. 1 and 2. In some examples, the frame format 300 may depict overlapping and non-overlapping SLIVs 305, which the UE 115 may use to perform TDRA grouping and generate a feedback codebook for one or more PDSCH transmissions.

As described with reference to FIG. 2, the UE 115-*a* may transmit capability information that indicates a UE capability for processing a PDSCH (e.g., any of pdsch-ProcessingType1-DifferentTB-PerSlot, pdsch-ProcessingType2, pdsch-ProcessingType2-Limited, cbgPDSCH-ProcessingType1-DifferentTB-PerSlot-r16, or cbgPDSCH-ProcessingType2-DifferentTB-PerSlot-r16) and that includes an indication that the UE 115 is capable of monitoring for more than one PDSCH transmission within a slot, per CC. In addition, the UE 115 may receive control information from the network entity 105 indicative of a codebook for HARQ-ACK feedback at the UE 115 (e.g., a Type 1 HARQ-ACK codebook). The codebook may include feedback information (e.g., ACK/NACK bits) related to the one or more PDSCH transmissions.

In some examples, the network entity 105 (via the control information) may indicate resources allocated for one or more PDSCH transmissions (e.g., via a resource grant), which may be indicated based on SLIVs 305. A SLIV 305 may define a start symbol and a quantity of consecutive symbols for PDSCH allocation in a slot using a single value. The control information may indicate multiple SLIVs 305-*a* and a single SLIV 305-*b*. In some examples, the frame format 300 may illustrate an example of PDSCH TDRAs that the UE 115 may encounter when receiving the control information. For example, the frame format 300 may include a TDRA row 0 and a TDRA row 1. In addition, the frame format 300 may indicate resources across multiple slots, including a slot n-4, a slot n-3, a slot n-2, a slot n-1, and a slot n.

In some cases, the UE 115 may generate the codebook for more than one PDSCH transmission received over resources indicated by the SLIVs 305. For slots that have a single SLIV 305-*a*, the UE 115 may generate a single ACK bit for inclusion in the codebook for each of the slots. For example, the UE may generate a single ACK bit for the slot n-3. For slots that have non-overlapping SLIVs 305, and if the UE 115 is capable of monitoring for more than one PDSCH transmission per slot, the UE 115 may perform TDRA grouping of the non-overlapping SLIVs 305 and include feedback in the codebook for one or more candidate PDSCH occasions over a set of CCs, as described herein with reference to FIG. 2.

Figure 4:
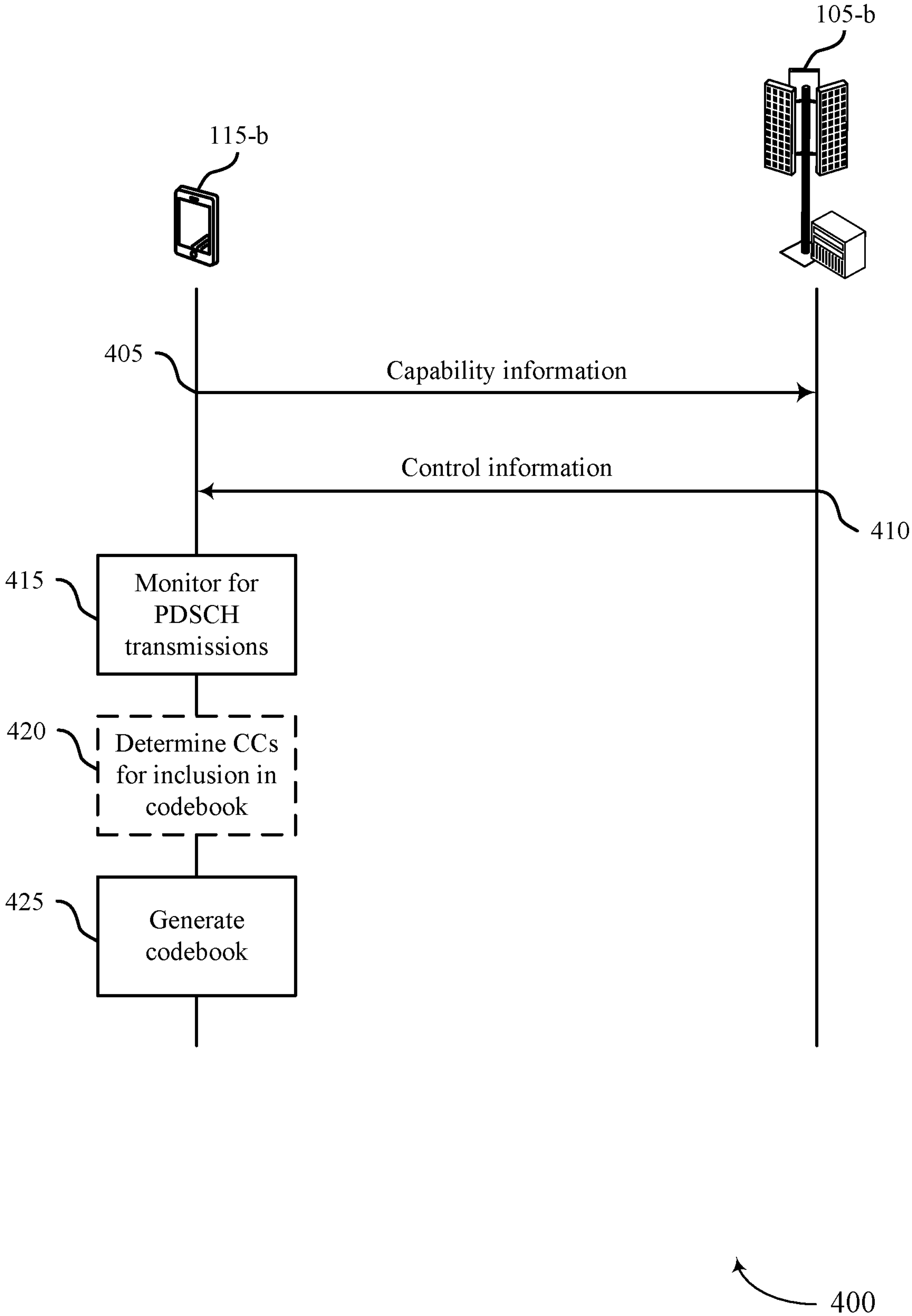
FIGS. 4 and 5 illustrate example of process flows that support type 1 HARQ-ACK codebook generation in accordance with one or more aspects of the present disclosure.

FIG. 4 illustrates an example of a process flow 400 that supports type 1 HARQ-ACK codebook generation in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a network entity 105-*b*, which may be examples of corresponding devices described herein. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may transmit, to the network entity 105-*b*, capability information that indicates a UE capability for processing of a PDSCH, where the capability information includes an indication that the UE 115-*b* is capable of monitoring for (and receiving) more than one PDSCH transmission within a slot per CC. The UE capability may include at least one of a first processing capability, a second processing capability, a limited second processing capability, or a CBG processing capability.

At 410, the UE 115-*b* may receive, from the network entity 105-*b*, control information indicative of a codebook for HARQ-ACK at the UE 115-*b*. For example, the UE 115-*b* may receive RRC signaling indicating a Type 1 HARQ-ACK codebook configuration.

At 415, the UE 115-*b* may monitor for one or more PDSCH transmissions over one or more CCs based on the control information. The CCs may be in a cell group or a frequency band of at least one frequency band combination.

At 420, the UE 115-*b* may determine a first set of CCs of the one or more CCs for which to include feedback in the codebook. In some examples, the UE 115-*b* may determine that the first set of CCs include all of the one or more CCs in a cell group of a frequency band in which the UE 115-*b* monitors for the one or more PDSCH transmissions based on the capability information indicating that the UE 115-*b* is capable of monitoring for the one or more PDSCH transmissions within the slot for at least a frequency band in a frequency band combination, a frequency band in a frequency band combination that includes the cell group, or a frequency band in a frequency band combination that is consistent with the one or more CCs across all frequency bands.

At 425, the UE 115-*b* may generate the HARQ-ACK codebook of the one or more PDSCH transmissions, where the codebook is based on the control information and includes feedback for a first set of CCs which is at least a portion of the one or more CCs, where the first set of CCs for which the feedback is included is based on a frequency band associated with the indication in the capability information. In some examples, the UE 115-*b* may include the feedback for the first set of CCs based on TDRA groups of non-overlapping SLIVs associated with one or more candidate PDSCH occasions.

Figure 5:
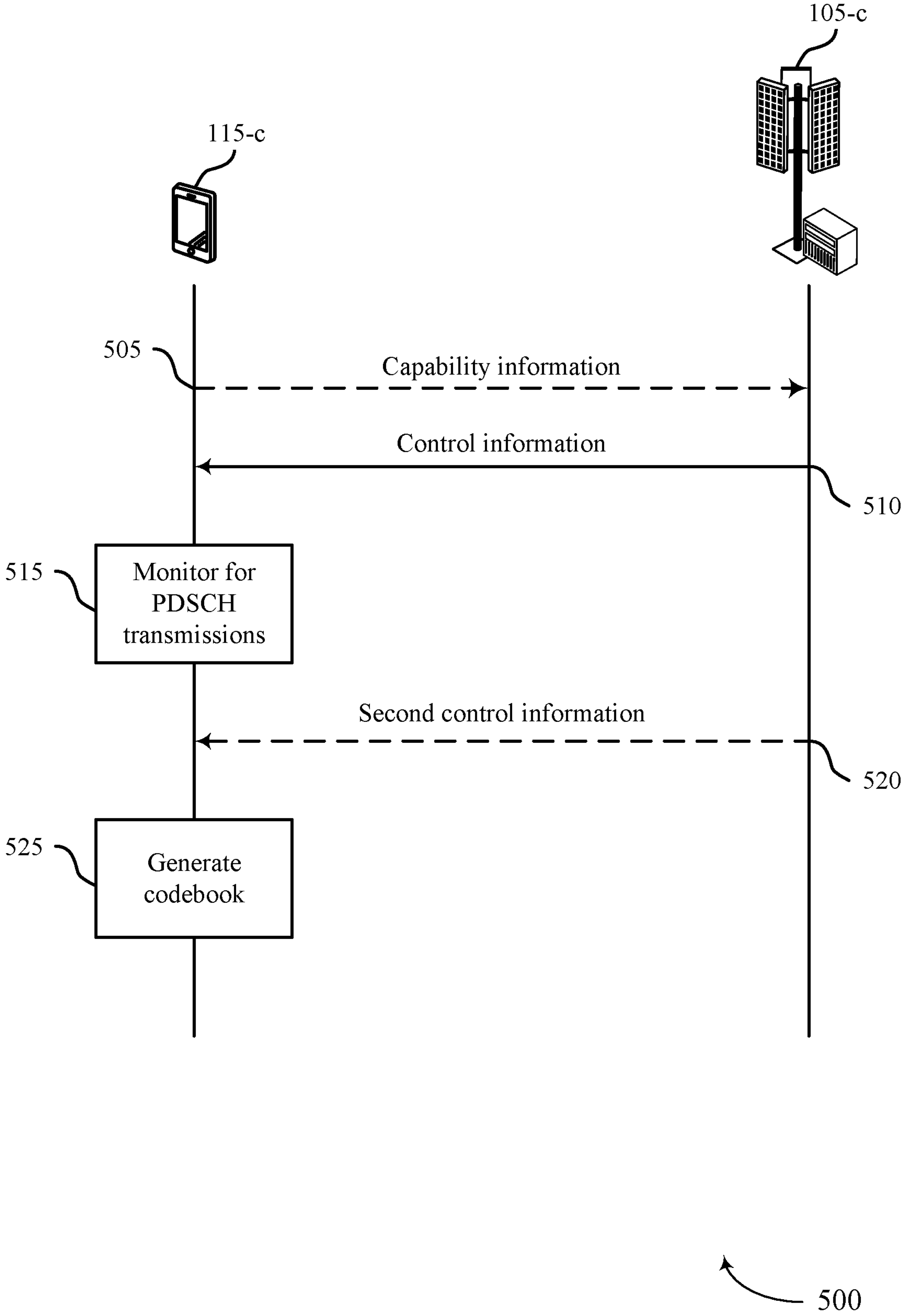

FIG. 5 illustrates an example of a process flow 500 that supports type 1 HARQ-ACK codebook generation in accordance with one or more aspects of the present disclosure. The process flow 500 may implement aspects of wireless communications systems 100 and 200, or may be implemented by aspects of the wireless communications system 100 and 200. For example, the process flow 500 may illustrate operations between a UE 115-*c* and a network entity 105-*c*, which may be examples of corresponding devices described herein. In the following description of the process flow 500, the operations between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the process flow 500, and other operations may be added to the process flow 500.

At 505, the UE 115-*c* may transmit, to the network entity 105-*c*, capability information that indicates a UE capability for processing of a PDSCH, where the capability information includes an indication that the UE 115-*c* is capable of a quantity of PDSCH transmissions the UE 115-*c* is capable of monitoring for within a slot. The UE capability may include at least one of a first processing capability, a second processing capability, a limited second processing capability, or a CBG processing capability.

At 510, the UE 115-*c* may receive, from the network entity 105-*c*, control information indicative of a codebook for HARQ-ACK at the UE 115-*c*, where the control information includes a first parameter (e.g., an RRC parameter) that disables or enables the UE 115-*c* to monitor for more than one PDSCH per slot. That is, the first parameter may indicate whether the UE 115-*c* may receive more than one PDSCH per slot such that the UE 115-*c* may generate a codebook (e.g., a Type 1 HARQ-ACK codebook) accordingly.

At 515, the UE 115-*c* may monitor for one or more PDSCH transmissions over one or more CCs. The CCs may be in a cell group or a frequency band of at least one frequency band combination.

At 520, the UE 115-*c* may receive, from the network entity 105-*c*, second control information that includes a second parameter that enables the first parameter on a per-cell group basis, where the first parameter is on a per-CC basis or a per-BWP basis. That is, the second parameter may indicate to the UE 115-*c* and the network entity 105-*c* that the first parameter is configured, and that the UE 115-*c* is to support more than one PDSCH transmissions per slot based on that capability being enabled in the first parameter (rather than based on explicit capability information from the UE 115-*c* as described herein with reference to FIG. 4).

At 525, the UE 115-*c* may generate the HARQ-ACK codebook of the one or more PDSCH transmissions, where the codebook is based on the control information and includes feedback for a first set of CCs based on the first parameter. For example, the UE 115-*c* may include feedback in the codebook for the first set of CCs if the first parameter enables the UE 115-*c* to support reception of more than one PDSCH occasion per slot.

Figure 6:
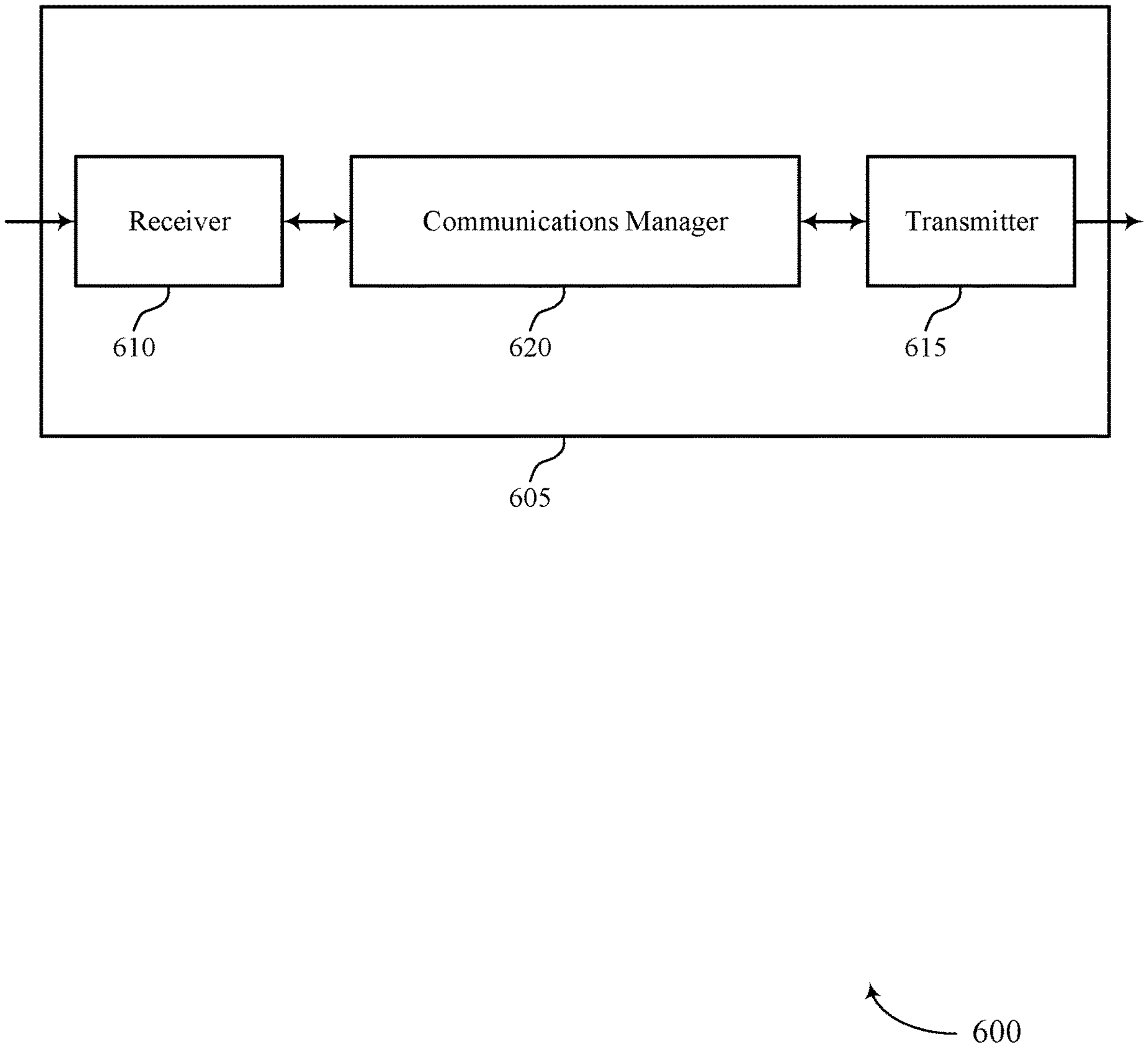
FIGS. 6 and 7 illustrate block diagrams of devices that support type 1 HARQ-ACK codebook generation in accordance with one or more aspects of the present disclosure.

FIG. 6 illustrates a block diagram 600 of a device 605 that supports type 1 HARQ-ACK codebook generation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to type 1 HARQ-ACK codebook generation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to type 1 HARQ-ACK codebook generation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of type 1 HARQ-ACK codebook generation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for transmitting capability information that indicates a UE capability for processing of a PDSCH, where the capability information includes an indication that the UE is capable of monitoring for more than one downlink shared channel transmission within a slot per CC. The communications manager 620 may be configured as or otherwise support a means for receiving control information indicative of a codebook for HARQ-ACK at the UE. The communications manager 620 may be configured as or otherwise support a means for monitoring for one or more downlink shared channel transmissions over one or more CCs based on the control information. The communications manager 620 may be configured as or otherwise support a means for generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

Additionally, or alternatively, the communications manager 620 may support wireless communication at a UE in accordance with examples as disclosed herein. For example, the communications manager 620 may be configured as or otherwise support a means for receiving control information indicative of a codebook for HARQ-ACK at the UE, where the control information includes a first parameter that disables or enables the UE to monitor for more than one downlink shared channel transmission per slot based on the control information. The communications manager 620 may be configured as or otherwise support a means for monitoring for one or more downlink shared channel transmissions based on the control information. The communications manager 620 may be configured as or otherwise support a means for generating the codebook for the HARQ-ACK of the one or more downlink shared channel transmissions, where the codebook is based on the control information and includes feedback for one or more CCs based on the first parameter.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for indicating type 1 HARQ-ACK codebook capabilities, which may improve resource utilization, clarify UE capabilities for receiving more than one PDSCH per slot, and ensure reciprocal network entity capabilities to improve communications between a UE and a network entity.

Figure 7:
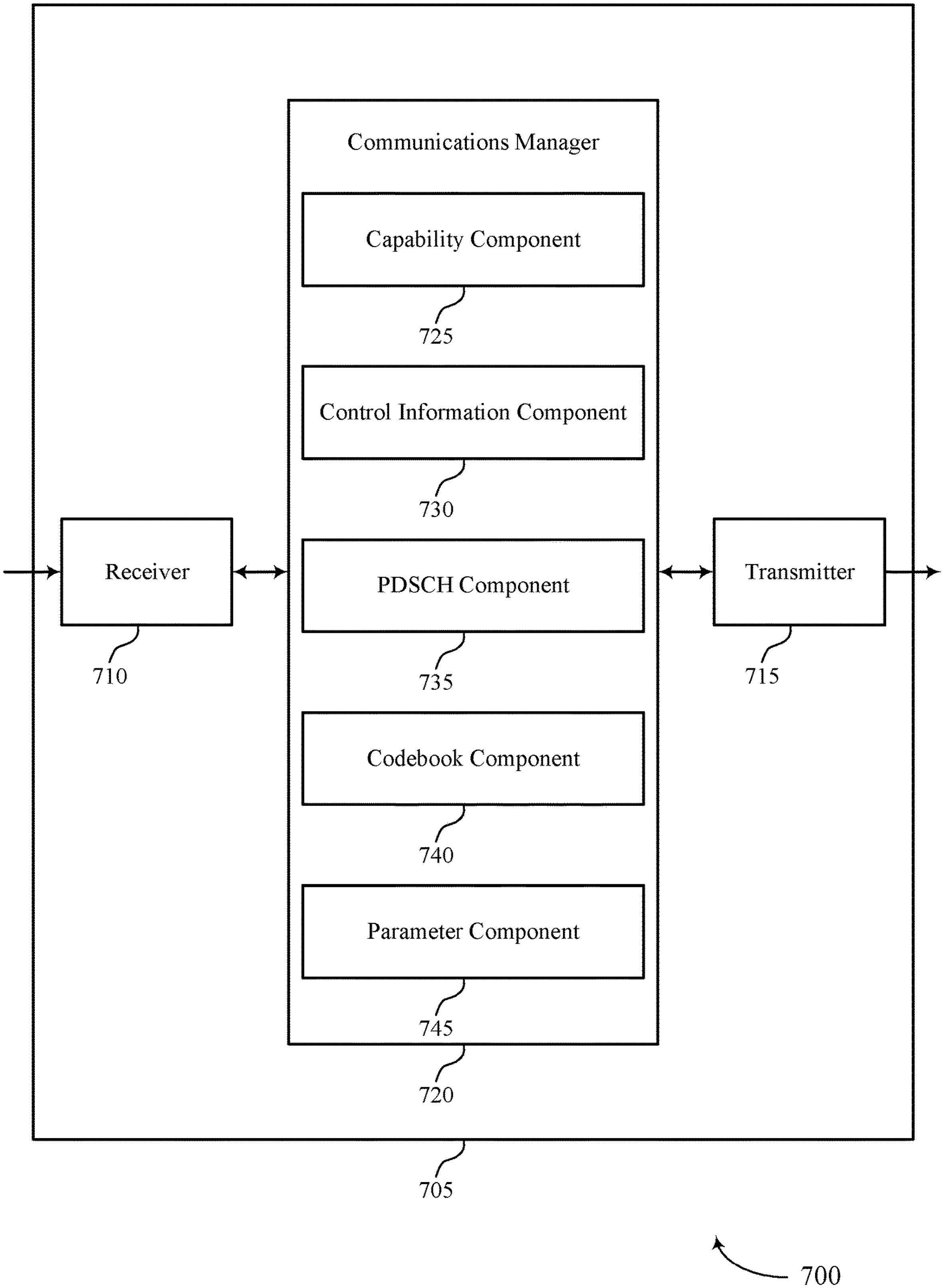

FIG. 7 illustrates a block diagram 700 of a device 705 that supports type 1 HARQ-ACK codebook generation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to type 1 HARQ-ACK codebook generation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to type 1 HARQ-ACK codebook generation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of type 1 HARQ-ACK codebook generation as described herein. For example, the communications manager 720 may include a capability component 725, a control information component 730, an PDSCH component 735, a codebook component 740, a parameter component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The capability component 725 may be configured as or otherwise support a means for transmitting capability information that indicates a UE capability for processing of a PDSCH, where the capability information includes an indication that the UE is capable of monitoring for more than one downlink shared channel transmission within a slot per CC. The control information component 730 may be configured as or otherwise support a means for receiving control information indicative of a codebook for HARQ-ACK at the UE. The PDSCH component 735 may be configured as or otherwise support a means for monitoring for one or more downlink shared channel transmissions over one or more CCs based on the control information. The codebook component 740 may be configured as or otherwise support a means for generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

Additionally, or alternatively, the communications manager 720 may support wireless communication at a UE in accordance with examples as disclosed herein. The parameter component 745 may be configured as or otherwise support a means for receiving control information indicative of a codebook for HARQ-ACK at the UE, where the control information includes a first parameter that disables or enables the UE to monitor for more than one downlink shared channel transmission per slot. The PDSCH component 735 may be configured as or otherwise support a means for monitoring for one or more downlink shared channel transmissions based on the control information. The codebook component 740 may be configured as or otherwise support a means for generating the codebook for the HARQ-ACK of the one or more downlink shared channel transmissions, where the codebook is based on the control information and includes feedback for one or more CCs based on the first parameter.

Figure 8:
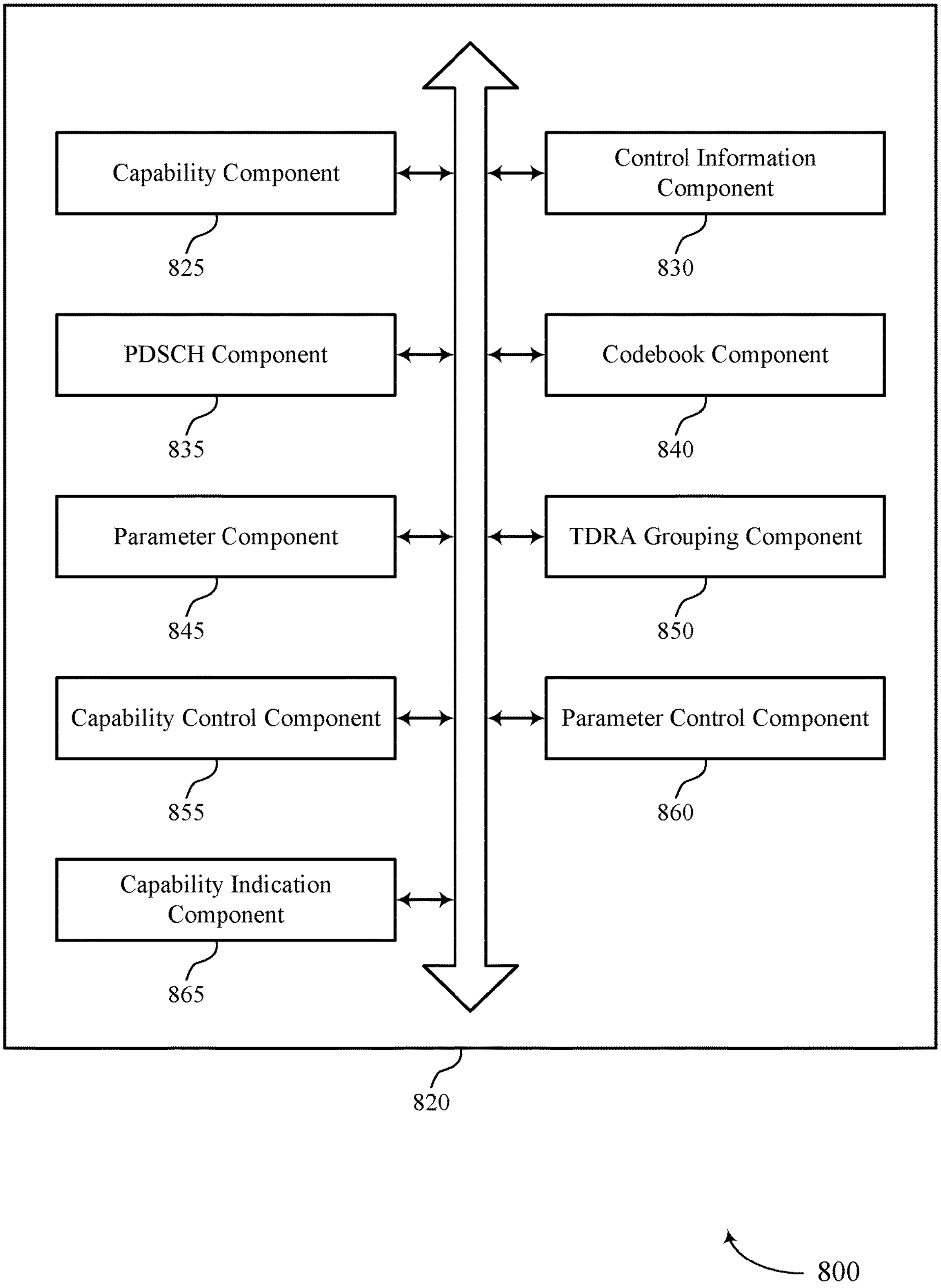
FIG. 8 illustrates a block diagram of a communications manager that supports type 1 HARQ-ACK codebook generation in accordance with one or more aspects of the present disclosure.

FIG. 8 illustrates a block diagram 800 of a communications manager 820 that supports type 1 HARQ-ACK codebook generation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of type 1 HARQ-ACK codebook generation as described herein. For example, the communications manager 820 may include a capability component 825, a control information component 830, an PDSCH component 835, a codebook component 840, a parameter component 845, a TDRA grouping component 850, a capability control component 855, a parameter control component 860, a capability indication component 865, or any combination thereof. Each of these components may communicate, directly or indirectly, with one another (e.g., via one or more buses).

The communications manager 820 may support wireless communication at a UE in accordance with examples as disclosed herein. The capability component 825 may be configured as or otherwise support a means for transmitting capability information that indicates a UE capability for processing of a PDSCH, where the capability information includes an indication that the UE is capable of monitoring for more than one downlink shared channel transmission within a slot per CC. The control information component 830 may be configured as or otherwise support a means for receiving control information indicative of a codebook for HARQ-ACK at the UE. The PDSCH component 835 may be configured as or otherwise support a means for monitoring for one or more downlink shared channel transmissions over one or more CCs based on the control information. The codebook component 840 may be configured as or otherwise support a means for generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

In some examples, to support generating the codebook, the TDRA grouping component 850 may be configured as or otherwise support a means for including the feedback for candidate downlink shared channel occasions over the first set of CCs based on TDRA (TDRA) groups of non-overlapping SLIVs (SLIVs).

In some examples, the TDRA grouping component 850 may be configured as or otherwise support a means for determining the first set of CCs as all of the one or more CCs in a cell group based on the indication in the capability information that indicates that the UE is capable of monitoring for the more than one downlink shared channel transmission within the slot for at least the frequency band in at least one frequency band combination.

In some examples, the TDRA grouping component 850 may be configured as or otherwise support a means for determining the first set of CCs as all of the one or more CCs in a cell group based on the indication in the capability information that indicates that the UE is capable of monitoring for the more than one downlink shared channel transmission within the slot for at least the frequency band in at least one frequency band combination that includes the cell group.

In some examples, the TDRA grouping component 850 may be configured as or otherwise support a means for determining the first set of CCs as all of the one or more CCs in the frequency band based on the indication in the capability information that indicates that the UE is capable of monitoring for the more than one downlink shared channel transmission within the slot for the frequency band in at least one frequency band combination.

In some examples, the TDRA grouping component 850 may be configured as or otherwise support a means for determining the first set of CCs as all of the one or more CCs in the frequency band based on the indication in the capability information that indicates that the UE is capable of monitoring for the more than one downlink shared channel transmission within the slot for the frequency band in at least one frequency band combination, where the at least one frequency band combination corresponds to the one or more CCs in one or more frequency bands.

In some examples, to support generating the codebook, the TDRA grouping component 850 may be configured as or otherwise support a means for including the feedback for a single candidate downlink shared channel occasion over a second set of CCs without identifying TDRA (TDRA) groups of non-overlapping SLIVs (SLIVs).

In some examples, the UE capability for the processing of the PDSCH included in the capability information includes one or more of a first UE capability associated with a first processing capability, a second UE capability associated with a second processing capability applicable for a set of multiple sub-carrier spacings, and a limited second UE capability associated with the second processing capability applicable for a subset of the set of multiple sub-carrier spacings, in addition to a CBG processing capability, where the first processing capability and the second processing capability are different.

In some examples, the capability indication component 865 may be configured as or otherwise support a means for determining that the UE is capable of monitoring for the more than one downlink shared channel transmission within the slot based on the indication being associated with the first UE capability without a CBG processing type being enabled.

In some examples, the capability indication component 865 may be configured as or otherwise support a means for determining that the UE is capable of monitoring for the more than one downlink shared channel transmission within the slot based on second control information that enables at least one of a second UE processing type or a limited second UE processing type for the UE.

In some examples, the capability indication component 865 may be configured as or otherwise support a means for determining that the UE is capable of monitoring for the more than one downlink shared channel transmission within the slot based on the indication being associated with the first UE capability and in an absence of the second UE processing type, the limited second UE processing type, and a CBG processing type being enabled.

In some examples, the capability indication component 865 may be configured as or otherwise support a means for receiving the second control information that enables a CBG processing type for the UE. In some examples, the capability indication component 865 may be configured as or otherwise support a means for determining that the UE is capable of monitoring for the more than one downlink shared channel transmission within the slot based on the indication being associated with the first UE capability and on the CBG processing type being enabled, and in an absence of the second UE processing type and the limited second UE processing type being enabled.

In some examples, the capability indication component 865 may be configured as or otherwise support a means for receiving the second control information that enables a CBG processing type for the UE and enables at least one of the second UE processing type or the limited second UE processing type for the UE. In some examples, the capability indication component 865 may be configured as or otherwise support a means for determining that the UE is capable of monitoring for the more than one downlink shared channel transmission within the slot based on the indication being associated with one of the second UE processing type or the limited second UE processing type and on the CBG processing type being enabled.

In some examples, the capability indication component 865 may be configured as or otherwise support a means for receiving the second control information that enables at least one of the second UE processing type or the limited second UE processing type for the UE. In some examples, the capability indication component 865 may be configured as or otherwise support a means for determining that the UE is capable of monitoring for the more than one downlink shared channel transmission within the slot based on the indication being associated with one of the second UE processing type or the limited second UE processing type, and in an absence of a CBG processing type being enabled.

In some examples, the capability indication component 865 may be configured as or otherwise support a means for determining that the UE is capable of monitoring for the more than one downlink shared channel transmission within the slot is further based on at least one of the second UE processing type or the limited second UE processing type indicating that the UE is capable of monitoring for the more than one downlink shared channel transmission within the slot.

Additionally, or alternatively, the communications manager 820 may support wireless communication at a UE in accordance with examples as disclosed herein. The parameter component 845 may be configured as or otherwise support a means for receiving control information indicative of a codebook for HARQ-ACK at the UE, where the control information includes a first parameter that disables or enables the UE to monitor for more than one downlink shared channel transmission per slot. In some examples, the PDSCH component 835 may be configured as or otherwise support a means for monitoring for one or more downlink shared channel transmissions based on the control information. In some examples, the codebook component 840 may be configured as or otherwise support a means for generating the codebook for the HARQ-ACK of the one or more downlink shared channel transmissions, where the codebook is based on the control information and includes feedback for one or more CCs based on the first parameter.

In some examples, the capability component 825 may be configured as or otherwise support a means for transmitting capability information that indicates a UE capability for processing of a PDSCH, where the capability information includes an indication of a quantity of downlink shared channel transmissions the UE is capable of monitoring for within a slot.

In some examples, the first parameter enables the UE to monitor for the more than one downlink shared channel transmission per slot on a per CC basis, or on a per bandwidth part basis, or on a per cell group basis.

In some examples, to support receiving the control information, the parameter component 845 may be configured as or otherwise support a means for receiving a second indication of a maximum quantity of downlink shared channel transmissions the UE is capable of monitoring for within the slot.

In some examples, the capability control component 855 may be configured as or otherwise support a means for transmitting a second UE capability for monitoring for the control information that includes the first parameter.

In some examples, the parameter control component 860 may be configured as or otherwise support a means for receiving second control information that includes a second parameter that enables the first parameter on a per cell group basis, where the first parameter is on a per CC basis or on a per bandwidth part basis.

In some examples, to support receiving the control information, the parameter component 845 may be configured as or otherwise support a means for receiving the first parameter, where the first parameter enables the UE to monitor for more than one downlink shared channel transmissions per slot or disables the UE to monitor for a single downlink shared channel transmission per slot.

In some examples, to support receiving the control information, the parameter component 845 may be configured as or otherwise support a means for receiving the first parameter, where the first parameter enables the UE to monitor for a single downlink shared channel transmission per slot or disables the UE to monitor for more than one downlink shared channel transmissions per slot.

Figure 9:
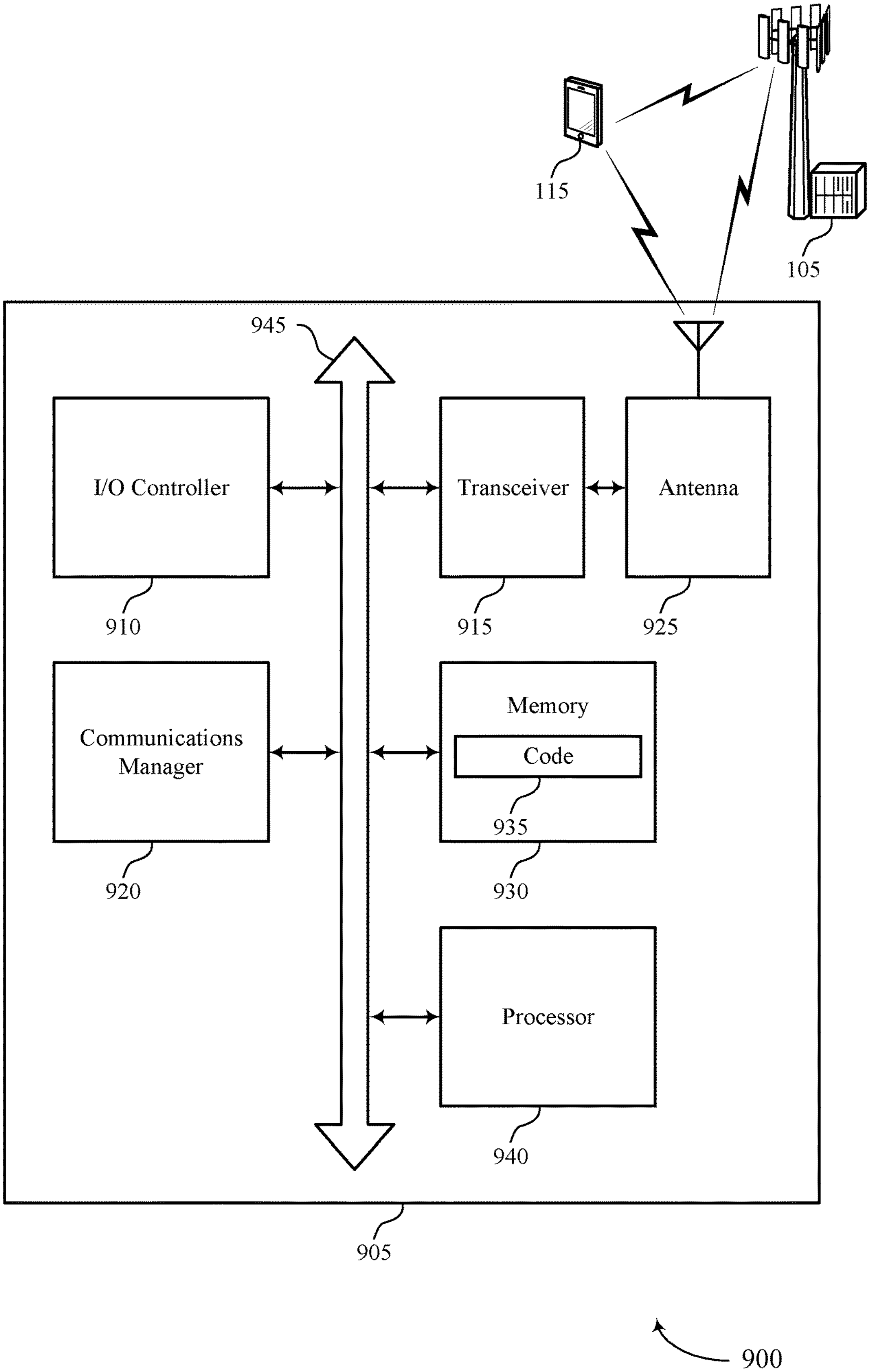
FIG. 9 illustrates a diagram of a system including a device that supports type 1 HARQ-ACK codebook generation in accordance with one or more aspects of the present disclosure.

FIG. 9 illustrates a diagram of a system 900 including a device 905 that supports type 1 HARQ-ACK codebook generation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting type 1 HARQ-ACK codebook generation). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting capability information that indicates a UE capability for processing of a PDSCH, where the capability information includes an indication that the UE is capable of monitoring for more than one downlink shared channel transmission within a slot per CC. The communications manager 920 may be configured as or otherwise support a means for receiving control information indicative of a codebook for HARQ-ACK at the UE. The communications manager 920 may be configured as or otherwise support a means for monitoring for one or more downlink shared channel transmissions over one or more CCs based on the control information. The communications manager 920 may be configured as or otherwise support a means for generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information.

Additionally, or alternatively, the communications manager 920 may support wireless communication at a UE in accordance with examples as disclosed herein. For example, the communications manager 920 may be configured as or otherwise support a means for receiving control information indicative of a codebook for HARQ-ACK at the UE, where the control information includes a first parameter that disables or enables the UE to monitor for more than one downlink shared channel transmission per slot. The communications manager 920 may be configured as or otherwise support a means for monitoring for one or more downlink shared channel transmissions based on the control information. The communications manager 920 may be configured as or otherwise support a means for generating the codebook for the HARQ-ACK of the one or more downlink shared channel transmissions, where the codebook is based on the control information and includes feedback for one or more CCs based on the first parameter.

By including or configuring the communications manager 920 in accordance with examples as described herein, the device 905 may support techniques for indicating type 1 HARQ-ACK codebook capabilities, which may improve resource utilization, clarify UE capabilities for receiving more than one PDSCH per slot, and ensure reciprocal network entity capabilities to improve communications between a UE and a network entity.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of type 1 HARQ-ACK codebook generation as described herein, or the processor 940 and the memory 930 may be otherwise configured to perform or support such operations.

Figure 10:
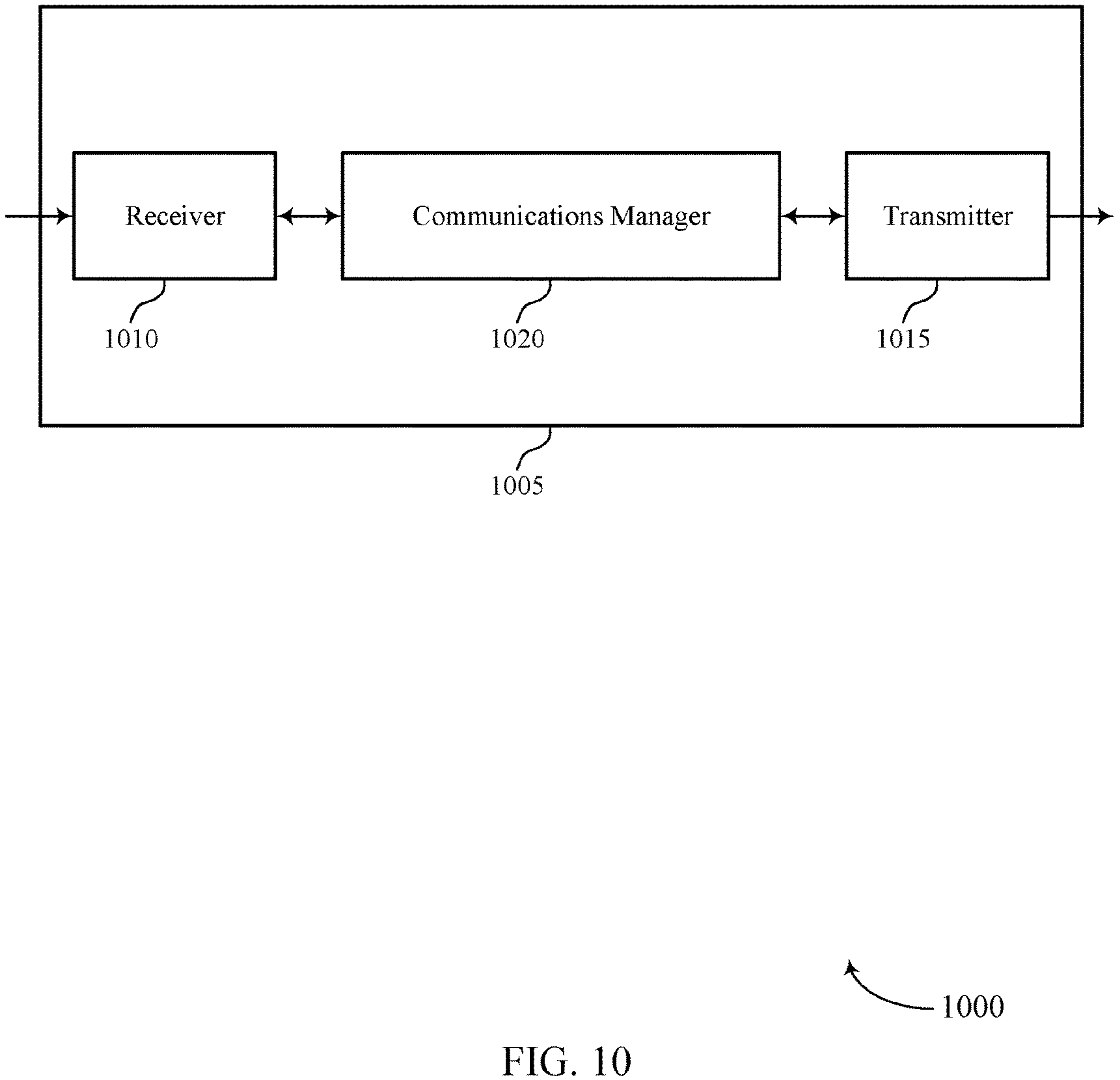
FIGS. 10 and 11 illustrate block diagrams of devices that support type 1 HARQ-ACK codebook generation in accordance with one or more aspects of the present disclosure.

FIG. 10 illustrates a block diagram 1000 of a device 1005 that supports type 1 HARQ-ACK codebook generation in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of type 1 HARQ-ACK codebook generation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for receiving capability information that indicates a UE capability for processing of a PDSCH, where the capability information includes an indication that a UE is capable of monitoring for more than one downlink shared channel transmission within a slot per CC. The communications manager 1020 may be configured as or otherwise support a means for transmitting control information indicative of a codebook for HARQ-ACK at the UE. The communications manager 1020 may be configured as or otherwise support a means for transmitting one or more downlink shared channel transmissions over one or more CCs. The communications manager 1020 may be configured as or otherwise support a means for receiving feedback for a first set of CCs which is at least a portion of the one or more CCs, the feedback included in the codebook, where the first set of CCs for which the feedback is included is based on a frequency band associated with the indication in the capability information.

Additionally, or alternatively, the communications manager 1020 may support wireless communication at a network entity in accordance with examples as disclosed herein. For example, the communications manager 1020 may be configured as or otherwise support a means for transmitting control information indicative of a codebook for HARQ-ACK at a UE, where the control information includes a first parameter that disables or enables the UE to monitor for more than one downlink shared channel transmission per slot. The communications manager 1020 may be configured as or otherwise support a means for transmitting one or more downlink shared channel transmissions. The communications manager 1020 may be configured as or otherwise support a means for receiving feedback for one or more CCs based on the first parameter, where the feedback is included in the codebook for the HARQ-ACK of the one or more downlink shared channel transmissions, and where the codebook is based on the control information.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for indicating type 1 HARQ-ACK codebook capabilities, which may improve resource utilization, clarify UE capabilities for receiving more than one PDSCH per slot, and ensure reciprocal network entity capabilities to improve communications between a UE and a network entity.

Figure 11:
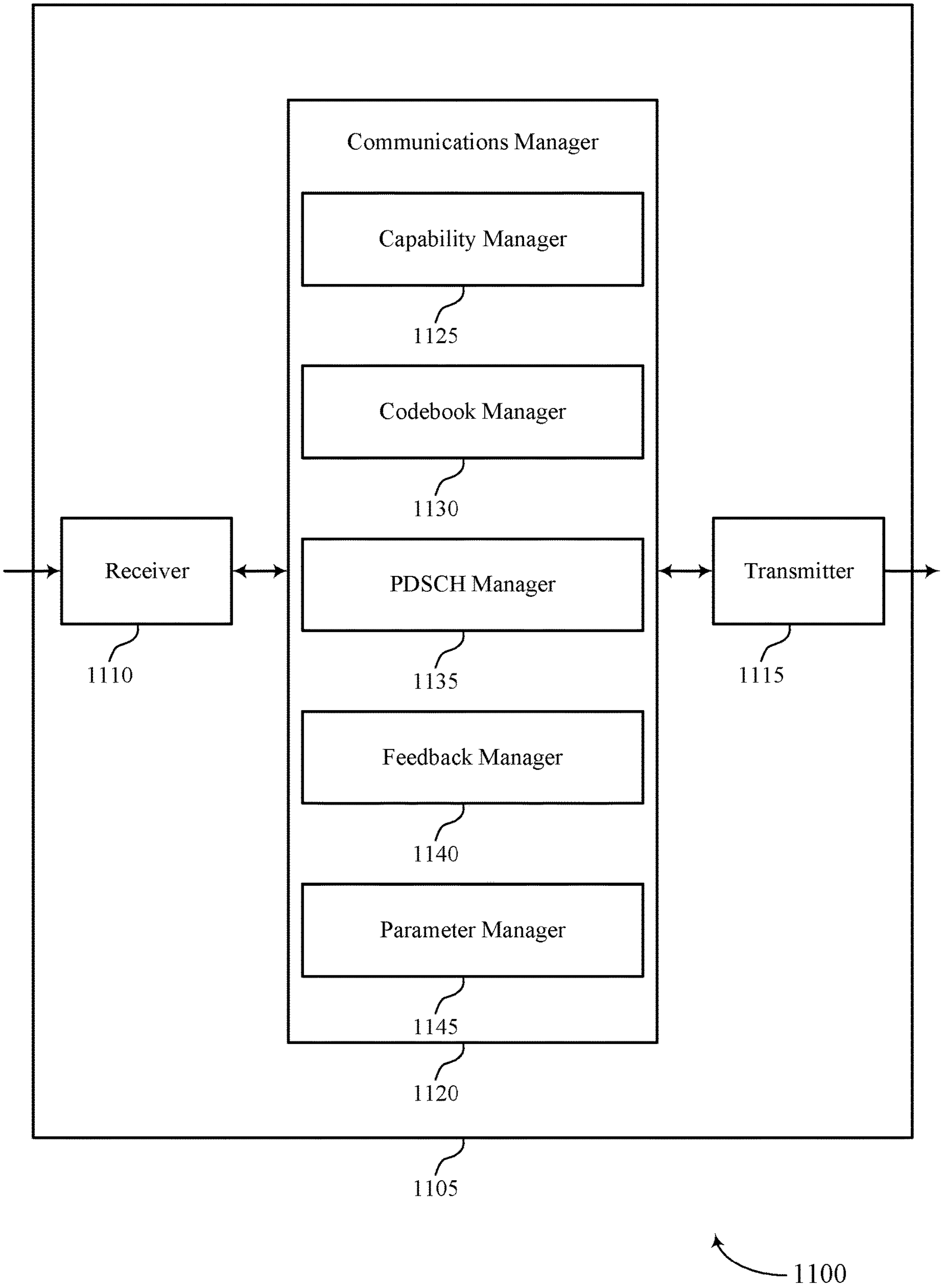

FIG. 11 illustrates a block diagram 1100 of a device 1105 that supports type 1 HARQ-ACK codebook generation in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of type 1 HARQ-ACK codebook generation as described herein. For example, the communications manager 1120 may include a capability manager 1125, a codebook manager 1130, an PDSCH manager 1135, a feedback manager 1140, a parameter manager 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The capability manager 1125 may be configured as or otherwise support a means for receiving capability information that indicates a UE capability for processing of a PDSCH, where the capability information includes an indication that a UE is capable of monitoring for more than one downlink shared channel transmission within a slot per CC. The codebook manager 1130 may be configured as or otherwise support a means for transmitting control information indicative of a codebook for HARQ-ACK at the UE. The PDSCH manager 1135 may be configured as or otherwise support a means for transmitting one or more downlink shared channel transmissions over one or more CCs. The feedback manager 1140 may be configured as or otherwise support a means for receiving feedback for a first set of CCs which is at least a portion of the one or more CCs, the feedback included in the codebook, where the first set of CCs for which the feedback is included is based on a frequency band associated with the indication in the capability information.

Additionally, or alternatively, the communications manager 1120 may support wireless communication at a network entity in accordance with examples as disclosed herein. The parameter manager 1145 may be configured as or otherwise support a means for transmitting control information indicative of a codebook for HARQ-ACK at a UE, where the control information includes a first parameter that disables or enables the UE to monitor for more than one downlink shared channel transmission per slot. The PDSCH manager 1135 may be configured as or otherwise support a means for transmitting one or more downlink shared channel transmissions. The feedback manager 1140 may be configured as or otherwise support a means for receiving feedback for one or more CCs based on the first parameter, where the feedback is included in the codebook for the HARQ-ACK of the one or more downlink shared channel transmissions, and where the codebook is based on the control information.

Figure 12:
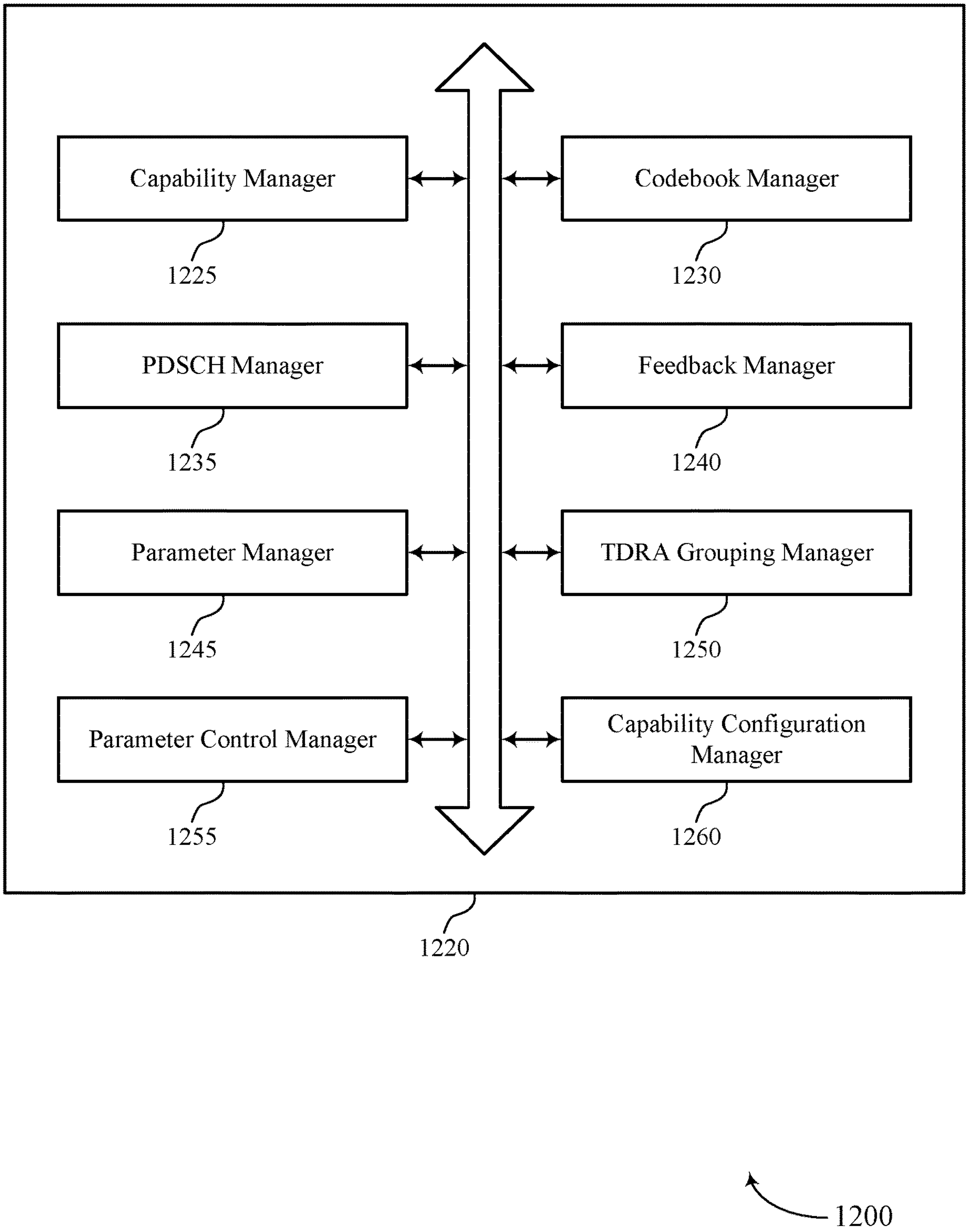
FIG. 12 illustrates a block diagram of a communications manager that supports type 1 HARQ-ACK codebook generation in accordance with one or more aspects of the present disclosure.

FIG. 12 illustrates a block diagram 1200 of a communications manager 1220 that supports type 1 HARQ-ACK codebook generation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of type 1 HARQ-ACK codebook generation as described herein. For example, the communications manager 1220 may include a capability manager 1225, a codebook manager 1230, an PDSCH manager 1235, a feedback manager 1240, a parameter manager 1245, a TDRA grouping manager 1250, a parameter control manager 1255, a capability configuration manager 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The capability manager 1225 may be configured as or otherwise support a means for receiving capability information that indicates a UE capability for processing of a PDSCH, where the capability information includes an indication that a UE is capable of monitoring for more than one downlink shared channel transmission within a slot per CC. The codebook manager 1230 may be configured as or otherwise support a means for transmitting control information indicative of a codebook for HARQ-ACK at the UE. The PDSCH manager 1235 may be configured as or otherwise support a means for transmitting one or more downlink shared channel transmissions over one or more CCs. The feedback manager 1240 may be configured as or otherwise support a means for receiving feedback for a first set of CCs which is at least a portion of the one or more CCs, the feedback included in the codebook, where the first set of CCs for which the feedback is included is based on a frequency band associated with the indication in the capability information.

In some examples, to support receiving the feedback, the feedback manager 1240 may be configured as or otherwise support a means for receiving the feedback for candidate downlink shared channel occasions over the first set of CCs based on TDRA (TDRA) groups of non-overlapping SLIVs (SLIVs).

In some examples, the TDRA grouping manager 1250 may be configured as or otherwise support a means for determining the first set of CCs as all of the one or more CCs in a cell group based on the indication in the capability information that indicates that the UE is capable of monitoring for the more than one downlink shared channel transmission within the slot for at least the frequency band in at least one frequency band combination.

In some examples, the TDRA grouping manager 1250 may be configured as or otherwise support a means for determining the first set of CCs as all of the one or more CCs in a cell group based on the indication in the capability information that indicates that the UE is capable of monitoring for the more than one downlink shared channel transmission within the slot for at least the frequency band in at least one frequency band combination that includes the cell group.

In some examples, the TDRA grouping manager 1250 may be configured as or otherwise support a means for determining the first set of CCs as all of the one or more CCs in the frequency band based on the indication in the capability information that indicates that the UE is capable of monitoring for the more than one downlink shared channel transmission within the slot for the frequency band in at least one frequency band combination.

In some examples, the TDRA grouping manager 1250 may be configured as or otherwise support a means for determining the first set of CCs as all of the one or more CCs in the frequency band based on the indication in the capability information that indicates that the UE is capable of monitoring for the more than one downlink shared channel transmission within the slot for the frequency band in at least one frequency band combination, where the at least one frequency band combination corresponds to the one or more CCs in one or more frequency bands.

In some examples, to support receiving the feedback, the TDRA grouping manager 1250 may be configured as or otherwise support a means for receiving the feedback for a single candidate downlink shared channel occasion over a second set of CCs without identifying TDRA (TDRA) groups of non-overlapping SLIVs (SLIVs).

In some examples, the UE capability for the processing of the PDSCH included in the capability information includes one or more of a first UE capability associated with a first processing capability, a second UE capability associated with a second processing capability applicable for a set of multiple sub-carrier spacings, and a limited second UE capability associated with the second processing capability applicable for a subset of the set of multiple sub-carrier spacings, in addition to a CBG processing capability, where the first processing capability and the second processing capability are different.

In some examples, the capability configuration manager 1260 may be configured as or otherwise support a means for determining that the UE is capable of monitoring for the more than one downlink shared channel transmission within the slot based on the indication being associated with the first UE capability without a CBG processing type being enabled.

In some examples, the capability configuration manager 1260 may be configured as or otherwise support a means for determining that the UE is capable of monitoring for the more than one downlink shared channel transmission within the slot based on second control information that enables at least one of a second UE processing type or a limited second UE processing type for the UE.

In some examples, the capability configuration manager 1260 may be configured as or otherwise support a means for determining that the UE is capable of monitoring for the more than one downlink shared channel transmission within the slot based on the indication being associated with the first UE capability and in an absence of the second UE processing type, the limited second UE processing type, and a CBG processing type being enabled.

In some examples, the capability configuration manager 1260 may be configured as or otherwise support a means for transmitting second control information that enables a CBG processing type for the UE. In some examples, the capability configuration manager 1260 may be configured as or otherwise support a means for determining that the UE is capable of monitoring for the more than one downlink shared channel transmission within the slot based on the indication being associated with the first UE capability and on the CBG processing type being enabled, and in an absence of the second UE processing type and the limited second UE processing type being enabled.

In some examples, the capability configuration manager 1260 may be configured as or otherwise support a means for transmitting second control information that enables a CBG processing type for the UE and enables at least one of the second UE processing type or the limited second UE processing type for the UE. In some examples, the capability configuration manager 1260 may be configured as or otherwise support a means for determining that the UE is capable of monitoring for the more than one downlink shared channel transmission within the slot based on the indication being associated with one of the second UE processing type or the limited second UE processing type and on a CBG processing type being enabled.

In some examples, the capability configuration manager 1260 may be configured as or otherwise support a means for transmitting second control information that enables at least one of the second UE processing type or the limited second UE processing type for the UE. In some examples, the capability configuration manager 1260 may be configured as or otherwise support a means for determining that the UE is capable of monitoring for the more than one downlink shared channel transmission within the slot based on the indication being associated with one of the second UE processing type or the limited second UE processing type, and in an absence of a CBG processing type being enabled.

In some examples, determining that the UE is capable of monitoring for the more than one downlink shared channel transmission within the slot is further based on at least one of the second UE processing type or the limited second UE processing type indicating that the UE is capable of monitoring for the more than one downlink shared channel transmission within the slot.

Additionally, or alternatively, the communications manager 1220 may support wireless communication at a network entity in accordance with examples as disclosed herein. The parameter manager 1245 may be configured as or otherwise support a means for transmitting control information indicative of a codebook for HARQ-ACK at a UE, where the control information includes a first parameter that disables or enables the UE to monitor for more than one downlink shared channel transmission per slot. In some examples, the PDSCH manager 1235 may be configured as or otherwise support a means for transmitting one or more downlink shared channel transmissions. In some examples, the feedback manager 1240 may be configured as or otherwise support a means for receiving feedback for one or more CCs based on the first parameter, where the feedback is included in the codebook for the HARQ-ACK of the one or more downlink shared channel transmissions, and where the codebook is based on the control information.

In some examples, the capability manager 1225 may be configured as or otherwise support a means for receiving capability information that indicates a UE capability for processing of a PDSCH, where the capability information includes an indication of a quantity of downlink shared channel transmissions the UE is capable of monitoring for within a slot.

In some examples, the first parameter enables the UE to monitor for the more than one downlink shared channel transmission per slot on a per CC basis, or on a per bandwidth part basis, or on a per cell group basis.

In some examples, to support transmitting the control information, the parameter manager 1245 may be configured as or otherwise support a means for transmitting a second indication of a maximum quantity of downlink shared channel transmissions the UE is capable of monitoring for within the slot.

In some examples, the parameter control manager 1255 may be configured as or otherwise support a means for receiving a second UE capability for monitoring for the control information that includes the first parameter.

In some examples, the parameter control manager 1255 may be configured as or otherwise support a means for transmitting second control information that includes a second parameter that enables the first parameter on a per cell group basis, where the first parameter is on a per CC basis or on a per bandwidth part basis.

In some examples, to support transmitting the control information, the parameter manager 1245 may be configured as or otherwise support a means for transmitting the first parameter, where the first parameter enables the UE to monitor for more than one downlink shared channel transmissions per slot or disables the UE to monitor for a single downlink shared channel transmission per slot.

In some examples, to support transmitting the control information, the parameter manager 1245 may be configured as or otherwise support a means for transmitting the first parameter, where the first parameter enables the UE to monitor for a single downlink shared channel transmission per slot or disables the UE to monitor for more than one downlink shared channel transmissions per slot.

Figure 13:
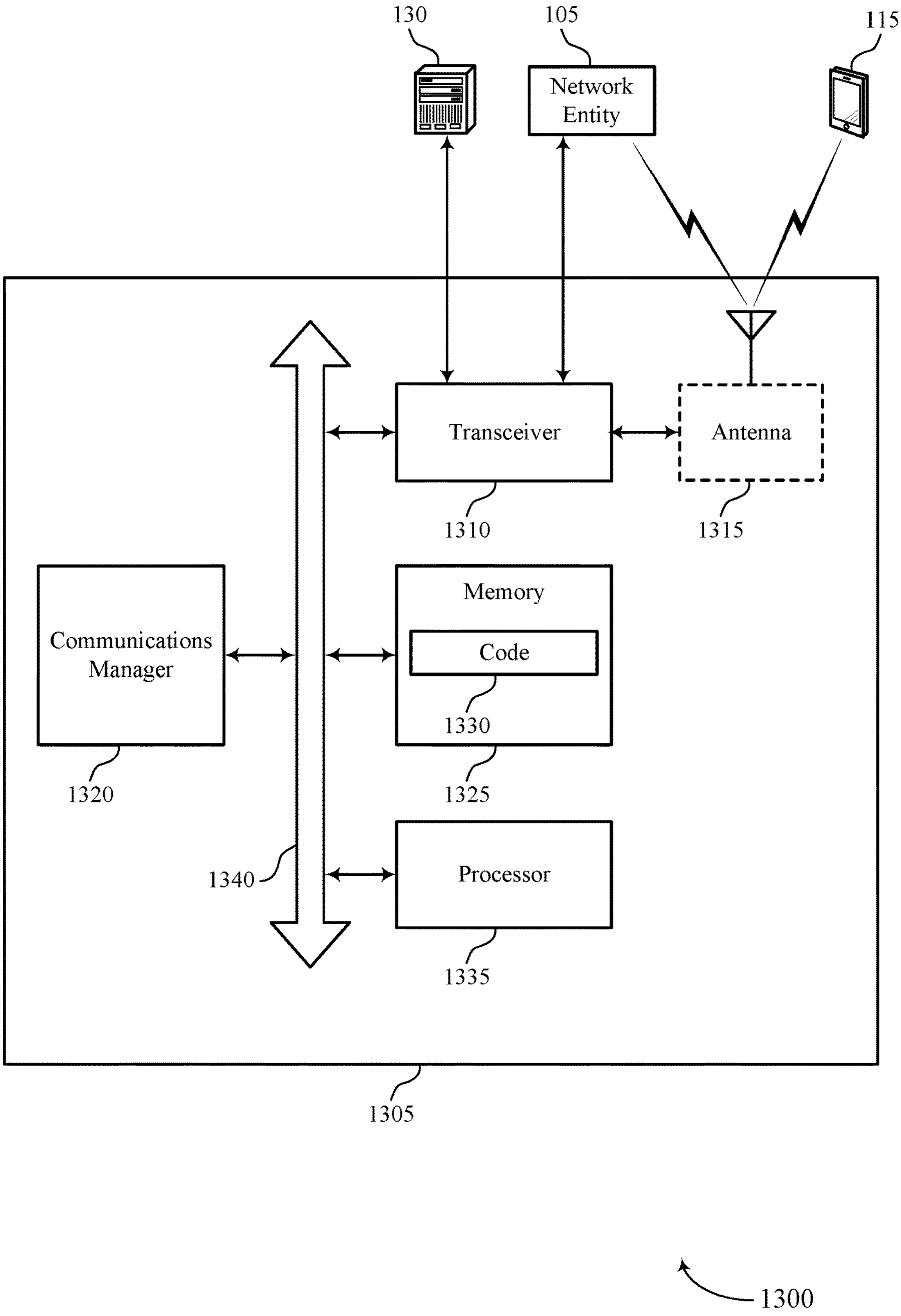
FIG. 13 illustrates a diagram of a system including a device that supports type 1 HARQ-ACK codebook generation in accordance with one or more aspects of the present disclosure.

FIG. 13 illustrates a diagram of a system 1300 including a device 1305 that supports type 1 HARQ-ACK codebook generation in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory.

In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting type 1 HARQ-ACK codebook generation). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more Ues 115. In some examples, the communications manager 1320 may manage communications with other network entities 105 and may include a controller or scheduler for controlling communications with Ues 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for receiving capability information that indicates a UE capability for processing of a PDSCH, where the capability information includes an indication that a UE is capable of monitoring for more than one downlink shared channel transmission within a slot per CC. The communications manager 1320 may be configured as or otherwise support a means for transmitting control information indicative of a codebook for HARQ-ACK at the UE. The communications manager 1320 may be configured as or otherwise support a means for transmitting one or more downlink shared channel transmissions over one or more CCs. The communications manager 1320 may be configured as or otherwise support a means for receiving feedback for a first set of CCs which is at least a portion of the one or more CCs, the feedback included in the codebook, where the first set of CCs for which the feedback is included is based on a frequency band associated with the indication in the capability information.

Additionally, or alternatively, the communications manager 1320 may support wireless communication at a network entity in accordance with examples as disclosed herein. For example, the communications manager 1320 may be configured as or otherwise support a means for transmitting control information indicative of a codebook for HARQ-ACK at a UE, where the control information includes a first parameter that disables or enables the UE to monitor for more than one downlink shared channel transmission per slot. The communications manager 1320 may be configured as or otherwise support a means for transmitting one or more downlink shared channel transmissions. The communications manager 1320 may be configured as or otherwise support a means for receiving feedback for one or more CCs based on the first parameter, where the feedback is included in the codebook for the HARQ-ACK of the one or more downlink shared channel transmissions, and where the codebook is based on the control information.

By including or configuring the communications manager 1320 in accordance with examples as described herein, the device 1305 may support techniques for indicating type 1 HARQ-ACK codebook capabilities, which may improve resource utilization, clarify UE capabilities for receiving more than one PDSCH per slot, and ensure reciprocal network entity capabilities to improve communications between a UE and a network entity.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of type 1 HARQ-ACK codebook generation as described herein, or the processor 1335 and the memory 1325 may be otherwise configured to perform or support such operations.

Figure 14:
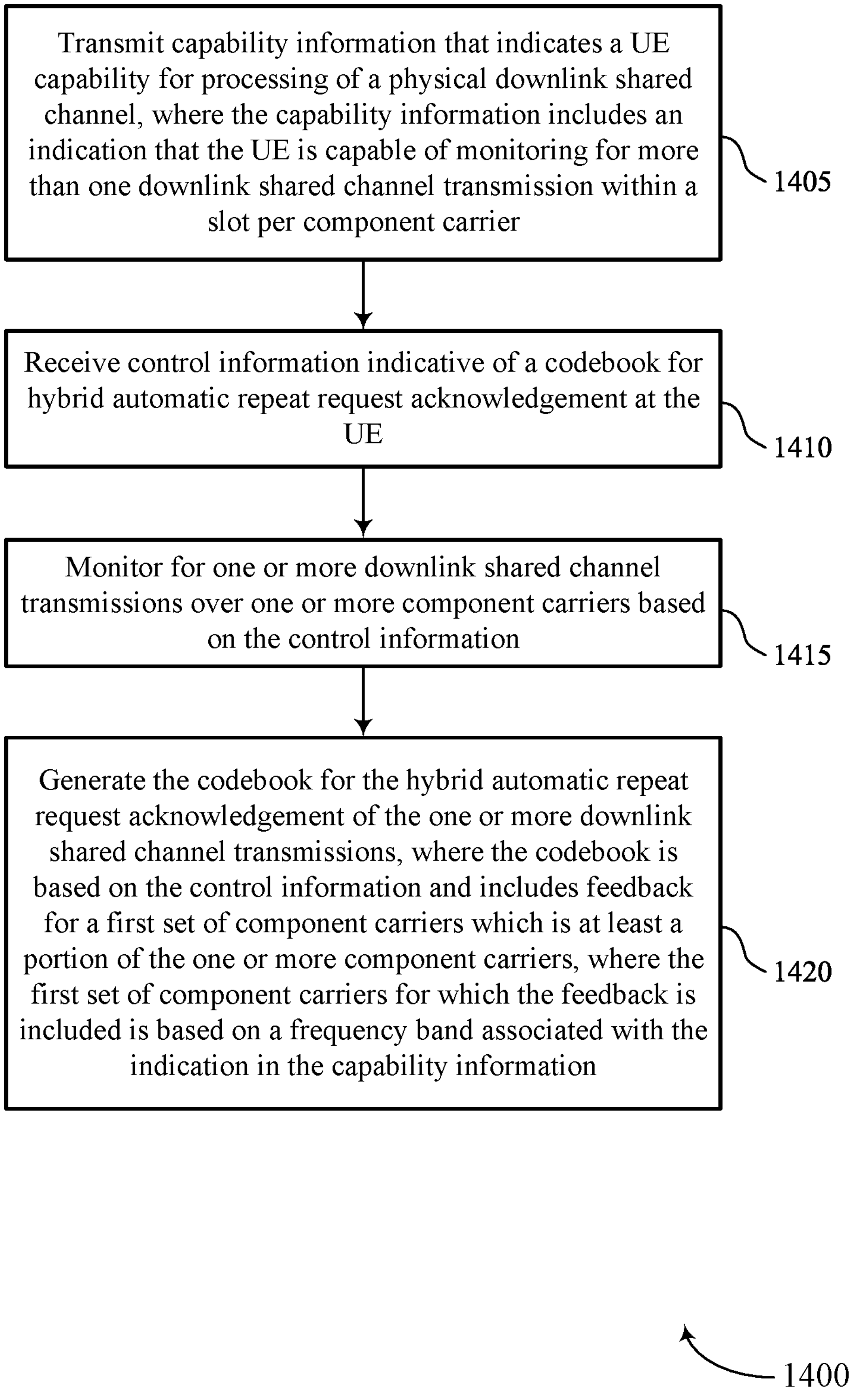
FIGS. 14 through 19 illustrate flowcharts showing methods that support type 1 HARQ-ACK codebook generation in accordance with one or more aspects of the present disclosure.

FIG. 14 illustrates a flowchart showing a method 1400 that supports type 1 HARQ-ACK codebook generation in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting capability information that indicates a UE capability for processing of a PDSCH, where the capability information includes an indication that the UE is capable of monitoring for more than one downlink shared channel transmission within a slot per CC. The operations of 1405 may be performed in accordance with examples as disclosed herein. In some examples, aspects of the operations of 1405 may be performed by a capability component 825 as described with reference to FIG. 8.

At 1410, the method may include receiving control information indicative of a codebook for HARQ-ACK at the UE. The operations of 1410 may be performed in accordance with examples as disclosed herein. In some examples, aspects of the operations of 1410 may be performed by a control information component 830 as described with reference to FIG. 8.

At 1415, the method may include monitoring for one or more downlink shared channel transmissions over one or more CCs based on the control information. The operations of 1415 may be performed in accordance with examples as disclosed herein. In some examples, aspects of the operations of 1415 may be performed by an PDSCH component 835 as described with reference to FIG. 8.

At 1420, the method may include generating the codebook for the HARQ-ACK of the one or more downlink shared channel transmissions, where the codebook is based on the control information and includes feedback for a first set of CCs which is at least a portion of the one or more CCs, where the first set of CCs for which the feedback is included is based on a frequency band associated with the indication in the capability information. The operations of 1420 may be performed in accordance with examples as disclosed herein. In some examples, aspects of the operations of 1420 may be performed by a codebook component 840 as described with reference to FIG. 8.

Figure 15:
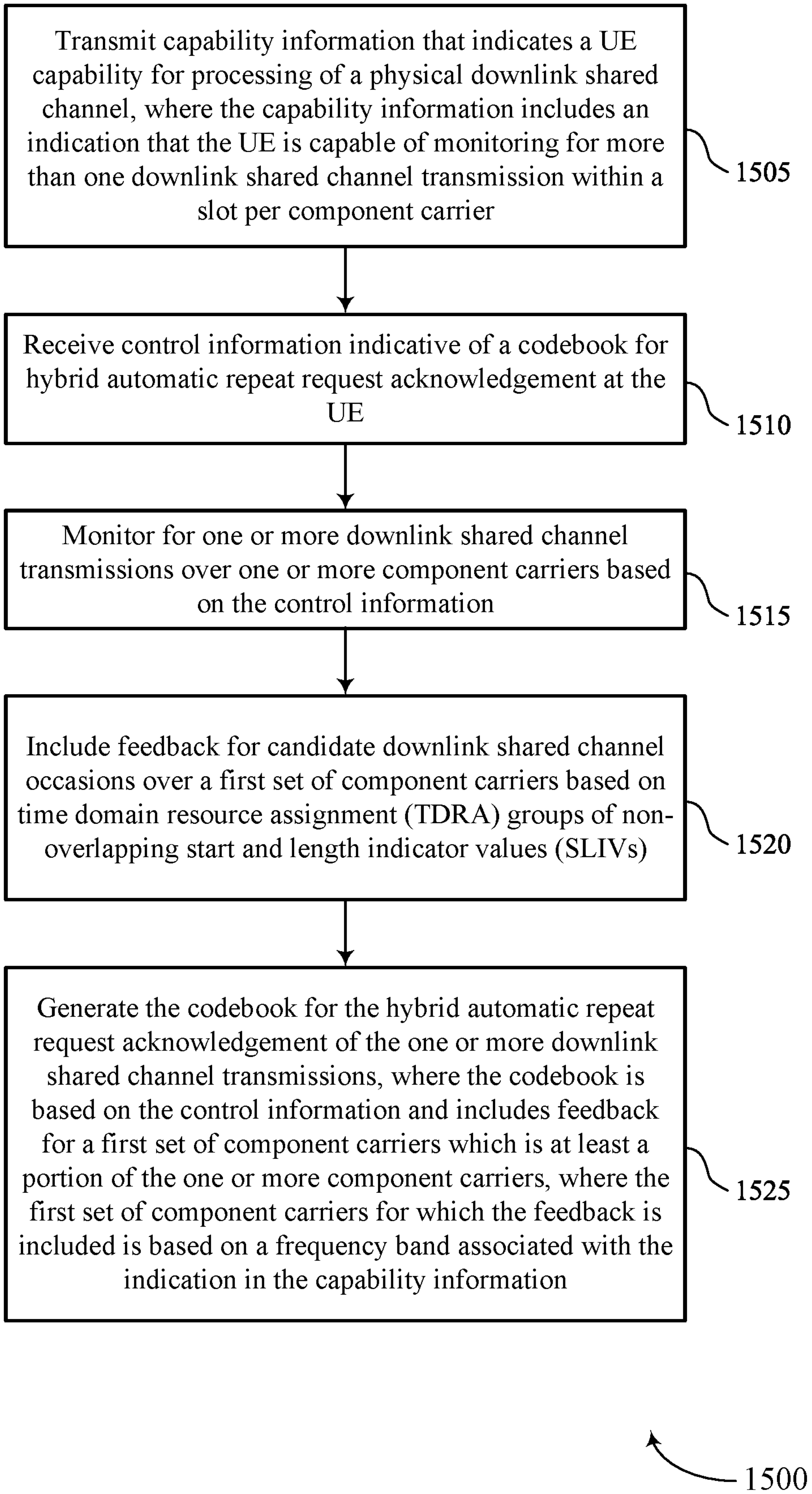

FIG. 15 illustrates a flowchart showing a method 1500 that supports type 1 HARQ-ACK codebook generation in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting capability information that indicates a UE capability for processing of a PDSCH, where the capability information includes an indication that the UE is capable of monitoring for more than one downlink shared channel transmission within a slot per CC. The operations of 1505 may be performed in accordance with examples as disclosed herein. In some examples, aspects of the operations of 1505 may be performed by a capability component 825 as described with reference to FIG. 8.

At 1510, the method may include receiving control information indicative of a codebook for HARQ-ACK at the UE. The operations of 1510 may be performed in accordance with examples as disclosed herein. In some examples, aspects of the operations of 1510 may be performed by a control information component 830 as described with reference to FIG. 8.

At 1515, the method may include monitoring for one or more downlink shared channel transmissions over one or more CCs based on the control information. The operations of 1515 may be performed in accordance with examples as disclosed herein. In some examples, aspects of the operations of 1515 may be performed by an PDSCH component 835 as described with reference to FIG. 8.

At 1520, the method may include including feedback for candidate downlink shared channel occasions over a first set of CCs based on TDRA (TDRA) groups of non-overlapping SLIVs (SLIVs). The operations of 1520 may be performed in accordance with examples as disclosed herein. In some examples, aspects of the operations of 1520 may be performed by a TDRA grouping component 850 as described with reference to FIG. 8.

At 1525, the method may include generating the codebook for the HARQ-ACK of the one or more downlink shared channel transmissions, where the codebook is based on the control information and includes the feedback for the first set of CCs which is at least a portion of the one or more CCs, where the first set of CCs for which the feedback is included is based on a frequency band associated with the indication in the capability information. The operations of 1525 may be performed in accordance with examples as disclosed herein. In some examples, aspects of the operations of 1525 may be performed by a codebook component 840 as described with reference to FIG. 8.

Figure 16:
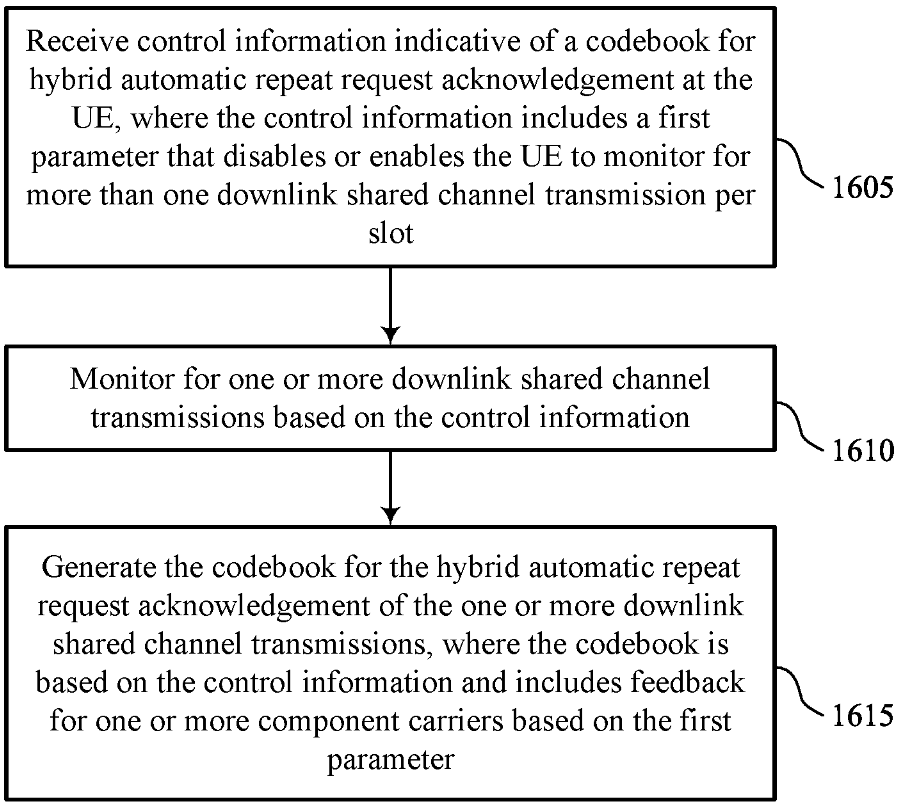

FIG. 16 illustrates a flowchart showing a method 1600 that supports type 1 HARQ-ACK codebook generation in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving control information indicative of a codebook for HARQ-ACK at the UE, where the control information includes a first parameter that disables or enables the UE to monitor for more than one downlink shared channel transmission per slot. The operations of 1605 may be performed in accordance with examples as disclosed herein. In some examples, aspects of the operations of 1605 may be performed by a parameter component 845 as described with reference to FIG. 8.

At 1610, the method may include monitoring for one or more downlink shared channel transmissions based on the control information. The operations of 1610 may be performed in accordance with examples as disclosed herein. In some examples, aspects of the operations of 1610 may be performed by an PDSCH component 835 as described with reference to FIG. 8.

At 1615, the method may include generating the codebook for the HARQ-ACK of the one or more downlink shared channel transmissions, where the codebook is based on the control information and includes feedback for one or more CCs based on the first parameter. The operations of 1615 may be performed in accordance with examples as disclosed herein. In some examples, aspects of the operations of 1615 may be performed by a codebook component 840 as described with reference to FIG. 8.

Figure 17:
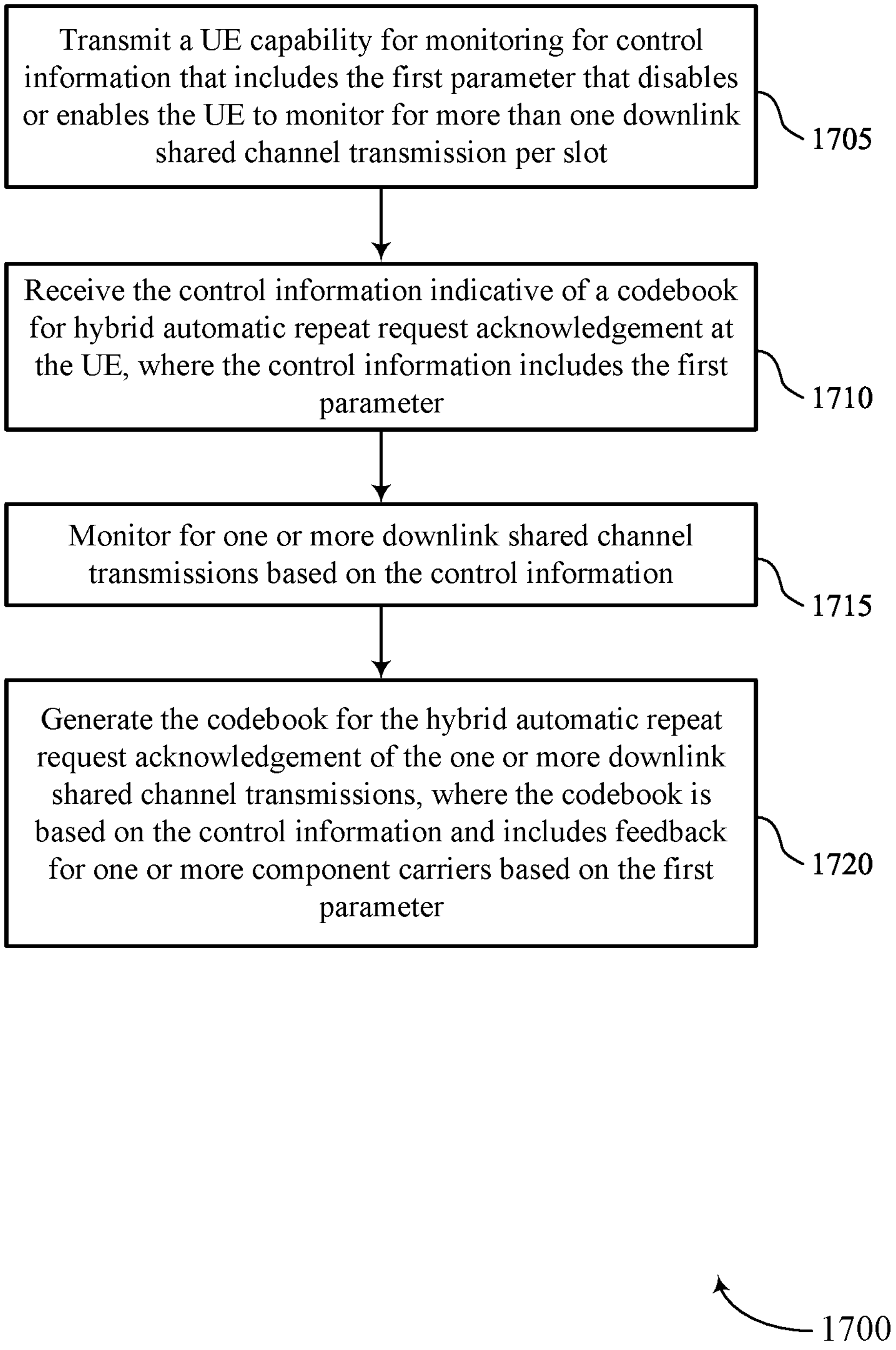

FIG. 17 illustrates a flowchart showing a method 1700 that supports type 1 HARQ-ACK codebook generation in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include transmitting a UE capability for monitoring for control information that includes a first parameter that disables or enables the UE to monitor for more than one downlink shared channel transmission per slot. The operations of 1705 may be performed in accordance with examples as disclosed herein. In some examples, aspects of the operations of 1705 may be performed by a capability control component 855 as described with reference to FIG. 8.

At 1710, the method may include receiving the control information indicative of a codebook for HARQ-ACK at the UE, where the control information includes the first parameter. The operations of 1710 may be performed in accordance with examples as disclosed herein. In some examples, aspects of the operations of 1710 may be performed by a parameter component 845 as described with reference to FIG. 8.

At 1715, the method may include monitoring for one or more downlink shared channel transmissions based on the control information. The operations of 1715 may be performed in accordance with examples as disclosed herein. In some examples, aspects of the operations of 1715 may be performed by an PDSCH component 835 as described with reference to FIG. 8.

At 1720, the method may include generating the codebook for the HARQ-ACK of the one or more downlink shared channel transmissions, where the codebook is based on the control information and includes feedback for one or more CCs based on the first parameter. The operations of 1720 may be performed in accordance with examples as disclosed herein. In some examples, aspects of the operations of 1720 may be performed by a codebook component 840 as described with reference to FIG. 8.

Figure 18:
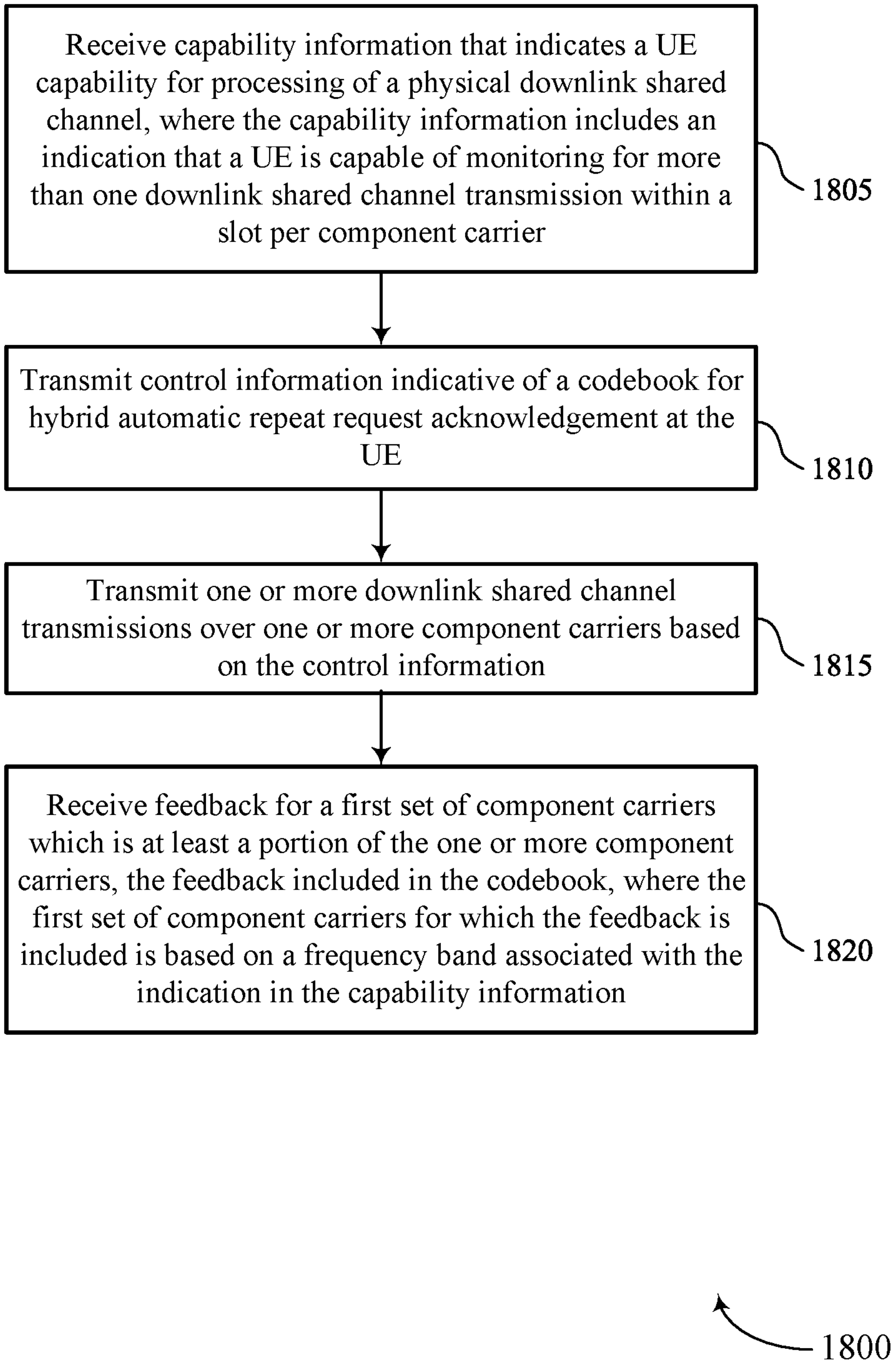

FIG. 18 illustrates a flowchart showing a method 1800 that supports type 1 HARQ-ACK codebook generation in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving capability information that indicates a UE capability for processing of a PDSCH, where the capability information includes an indication that a UE is capable of monitoring for more than one downlink shared channel transmission within a slot per CC. The operations of 1805 may be performed in accordance with examples as disclosed herein. In some examples, aspects of the operations of 1805 may be performed by a capability manager 1225 as described with reference to FIG. 12.

At 1810, the method may include transmitting control information indicative of a codebook for HARQ-ACK at the UE. The operations of 1810 may be performed in accordance with examples as disclosed herein. In some examples, aspects of the operations of 1810 may be performed by a codebook manager 1230 as described with reference to FIG. 12.

At 1815, the method may include transmitting one or more downlink shared channel transmissions over one or more CCs. The operations of 1815 may be performed in accordance with examples as disclosed herein. In some examples, aspects of the operations of 1815 may be performed by an PDSCH manager 1235 as described with reference to FIG. 12.

At 1820, the method may include receiving feedback for a first set of CCs which is at least a portion of the one or more CCs, the feedback included in the codebook, where the first set of CCs for which the feedback is included is based on a frequency band associated with the indication in the capability information. The operations of 1820 may be performed in accordance with examples as disclosed herein. In some examples, aspects of the operations of 1820 may be performed by a feedback manager 1240 as described with reference to FIG. 12.

Figure 19:
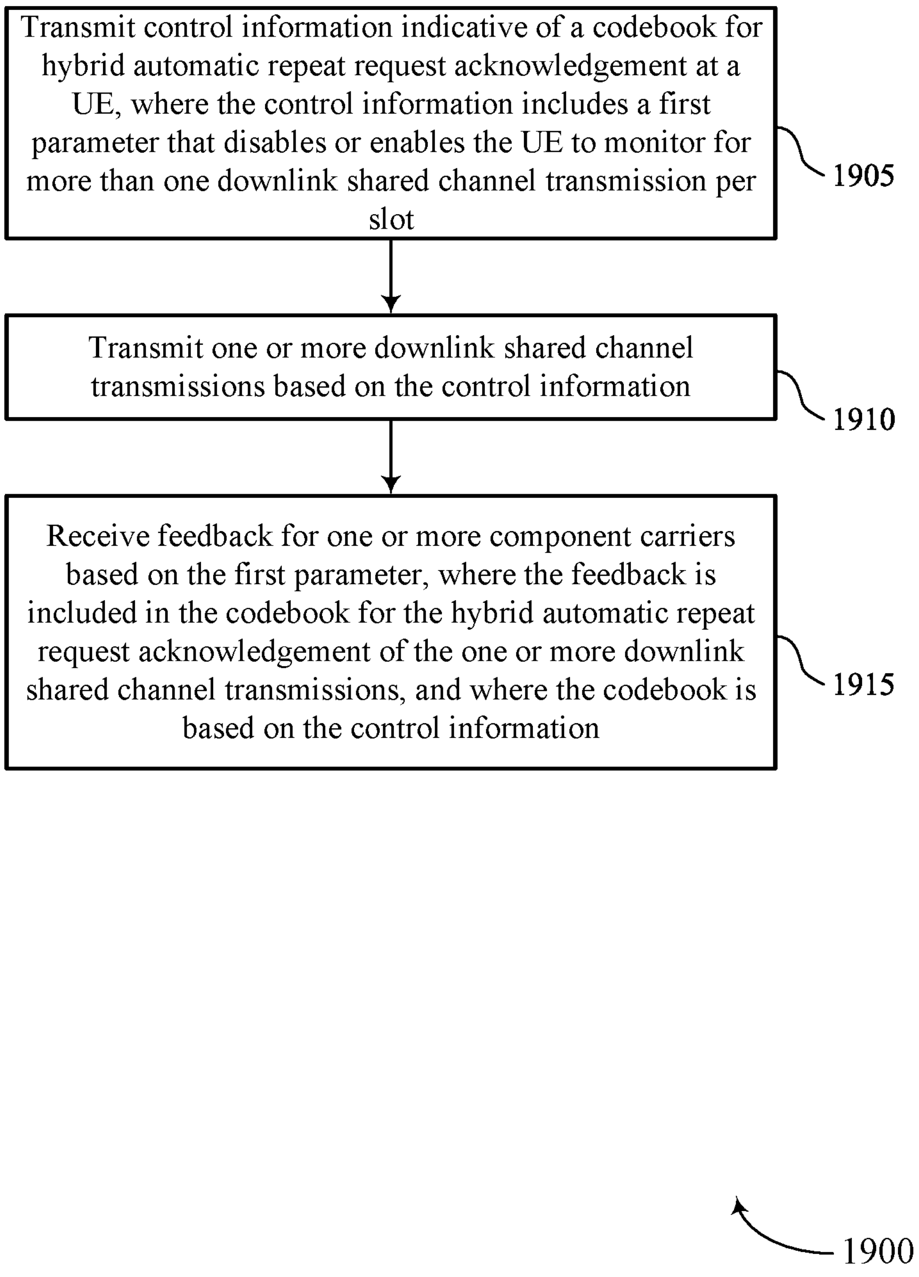

FIG. 19 illustrates a flowchart showing a method 1900 that supports type 1 HARQ-ACK codebook generation in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting control information indicative of a codebook for HARQ-ACK at a UE, where the control information includes a first parameter that disables or enables the UE to monitor for more than one downlink shared channel transmission per slot. The operations of 1905 may be performed in accordance with examples as disclosed herein. In some examples, aspects of the operations of 1905 may be performed by a parameter manager 1245 as described with reference to FIG. 12.

At 1910, the method may include transmitting one or more downlink shared channel transmissions. The operations of 1910 may be performed in accordance with examples as disclosed herein. In some examples, aspects of the operations of 1910 may be performed by an PDSCH manager 1235 as described with reference to FIG. 12.

At 1915, the method may include receiving feedback for one or more CCs based on the first parameter, where the feedback is included in the codebook for the HARQ-ACK of the one or more downlink shared channel transmissions, and where the codebook is based on the control information. The operations of 1915 may be performed in accordance with examples as disclosed herein. In some examples, aspects of the operations of 1915 may be performed by a feedback manager 1240 as described with reference to FIG. 12.

The following provides an overview of aspects of the present disclosure:

Aspect 1: A method for wireless communication at a UE, comprising: transmitting capability information that indicates a UE capability for processing of a PDSCH, wherein the capability information includes an indication that the UE is capable of monitoring for more than one downlink shared channel transmission within a slot per CC; receiving control information indicative of a codebook for HARQ-ACK at the UE; monitoring for one or more downlink shared channel transmissions over one or more CCs based on the control information; and generating the codebook for the HARQ-ACK of the one or more downlink shared channel transmissions, wherein the codebook is based at least in part on the control information and includes feedback for a first set of CCs which is at least a portion of the one or more CCs, wherein the first set of CCs for which the feedback is included is based at least in part on a frequency band associated with the indication in the capability information.

Aspect 2: The method of aspect 1, wherein generating the codebook comprises: including the feedback for candidate downlink shared channel occasions over the first set of CCs based at least in part on TDRA groups of non-overlapping SLIVs.

Aspect 3: The method of aspect 2, further comprising: determining the first set of CCs as all of the one or more CCs in a cell group based at least in part on the indication in the capability information that indicates that the UE is capable of monitoring for the more than one downlink shared channel transmission within the slot for at least the frequency band in at least one frequency band combination.

Aspect 4: The method of any of aspects 2 through 3, further comprising: determining the first set of CCs as all of the one or more CCs in a cell group based at least in part on the indication in the capability information that indicates that the UE is capable of monitoring for the more than one downlink shared channel transmission within the slot for at least the frequency band in at least one frequency band combination that includes the cell group.

Aspect 5: The method of any of aspects 2 through 4, further comprising: determining the first set of CCs as all of the one or more CCs in the frequency band based at least in part on the indication in the capability information that indicates that the UE is capable of monitoring for the more than one downlink shared channel transmission within the slot for the frequency band in at least one frequency band combination.

Aspect 6: The method of any of aspects 2 through 5, further comprising: determining the first set of CCs as all of the one or more CCs in the frequency band based at least in part on the indication in the capability information that indicates that the UE is capable of monitoring for the more than one downlink shared channel transmission within the slot for the frequency band in at least one frequency band combination, wherein the at least one frequency band combination corresponds to the one or more CCs in one or more frequency bands.

Aspect 7: The method of any of aspects 1 through 6, wherein generating the codebook comprises: including the feedback for a single candidate downlink shared channel occasion over a second set of CCs without identifying TDRA groups of non-overlapping SLIVs.

Aspect 8: The method of any of aspects 1 through 7, wherein the UE capability for the processing of the PDSCH included in the capability information includes one or more of a first UE capability associated with a first processing capability, a second UE capability associated with a second processing capability applicable for a plurality of sub-carrier spacings, and a limited second UE capability associated with the second processing capability applicable for a subset of the plurality of sub-carrier spacings, in addition to a CBG processing capability, wherein the first processing capability and the second processing capability are different.

Aspect 9: The method of aspect 8, further comprising: determining that the UE is capable of monitoring for the more than one downlink shared channel transmission within the slot based at least in part on the indication being associated with the first UE capability without a CBG processing type being enabled.

Aspect 10: The method of any of aspects 8 through 9, further comprising: determining that the UE is capable of monitoring for the more than one downlink shared channel transmission within the slot based at least in part on second control information that enables at least one of the second UE capability or the limited second UE capability for the UE.

Aspect 11: The method of aspect 10, further comprising: determining that the UE is capable of monitoring for the more than one downlink shared channel transmission within the slot based at least in part on the indication being associated with the first UE capability and in an absence of the second UE processing type, the limited second UE processing type, and a CBG processing type being enabled.

Aspect 12: The method of any of aspects 10 through 11, further comprising: receiving the second control information that enables a CBG processing type for the UE; and determining that the UE is capable of monitoring for the more than one downlink shared channel transmission within the slot based at least in part on the indication being associated with the first UE capability and on the CBG processing type being enabled, and in an absence of the second UE processing type and the limited second UE processing type being enabled.

Aspect 13: The method of any of aspects 10 through 12, further comprising: receiving the second control information that enables a CBG processing type for the UE and enables at least one of the second UE processing type or the limited second UE processing type for the UE; and determining that the UE is capable of monitoring for the more than one downlink shared channel transmission within the slot based at least in part on the indication being associated with one of the second UE processing type or the limited second UE processing type and on the CBG processing type being enabled.

Aspect 14: The method of any of aspects 10 through 13, further comprising: receiving the second control information that enables at least one of the second UE processing type or the limited second UE processing type for the UE; and determining that the UE is capable of monitoring for the more than one downlink shared channel transmission within the slot based at least in part on the indication being associated with one of the second UE processing type or the limited second UE processing type, and in an absence of a CBG processing type being enabled.

Aspect 15: The method of aspect 14, further comprising: determining that the UE is capable of monitoring for the more than one downlink shared channel transmission within the slot is further based at least in part on at least one of the second UE processing type or the limited second UE processing type indicating that the UE is capable of monitoring for the more than one downlink shared channel transmission within the slot.

Aspect 16: A method for wireless communication at a UE, comprising: receiving control information indicative of a codebook for HARQ-ACK at the UE, wherein the control information includes a first parameter that disables or enables the UE to monitor for more than one downlink shared channel transmission per slot; monitoring for one or more downlink shared channel transmissions based on the control information; and generating the codebook for the HARQ-ACK of the one or more downlink shared channel transmissions, wherein the codebook is based at least in part on the control information and includes feedback for one or more CCs based at least in part on the first parameter.

Aspect 17: The method of aspect 16, further comprising: transmitting capability information that indicates a UE capability for processing of a PDSCH, wherein the capability information includes an indication of a quantity of downlink shared channel transmissions the UE is capable of monitoring for within a slot.

Aspect 18: The method of any of aspects 16 through 17, wherein the first parameter enables the UE to monitor for the more than one downlink shared channel transmission per slot on a per CC basis, or on a per BWP basis, or on a per cell group basis.

Aspect 19: The method of any of aspects 16 through 18, wherein receiving the control information comprises: receiving a second indication of a maximum quantity of downlink shared channel transmissions the UE is capable of monitoring for within the slot.

Aspect 20: The method of any of aspects 16 through 19, further comprising: transmitting a second UE capability for monitoring for the control information that includes the first parameter.

Aspect 21: The method of any of aspects 16 through 20, further comprising: receiving second control information that includes a second parameter that enables the first parameter on a per cell group basis, wherein the first parameter is on a per CC basis or on a per BWP basis.

Aspect 22: The method of any of aspects 16 through 21, wherein receiving the control information comprises: receiving the first parameter, wherein the first parameter enables the UE to monitor for more than one downlink shared channel transmissions per slot or disables the UE to monitor for a single downlink shared channel transmission per slot.

Aspect 23: The method of any of aspects 16 through 22, wherein receiving the control information comprises: receiving the first parameter, wherein the first parameter enables the UE to monitor for a single downlink shared channel transmission per slot or disables the UE to monitor for more than one downlink shared channel transmissions per slot.

Aspect 24: A method for wireless communication at a network entity, comprising: receiving capability information that indicates a UE capability for processing of a PDSCH, wherein the capability information includes an indication that a UE is capable of monitoring for more than one downlink shared channel transmission within a slot per CC; transmitting control information indicative of a codebook for HARQ-ACK at the UE; transmitting one or more downlink shared channel transmissions over one or more CCs; and receiving feedback for a first set of CCs which is at least a portion of the one or more CCs, the feedback included in the codebook, wherein the first set of CCs for which the feedback is included is based at least in part on a frequency band associated with the indication in the capability information.

Aspect 25: The method of aspect 24, wherein receiving the feedback comprises: receiving the feedback for candidate downlink shared channel occasions over the first set of CCs based at least in part on TDRA groups of non-overlapping SLIVs.

Aspect 26: The method of aspect 25, further comprising: determining the first set of CCs as all of the one or more CCs in a cell group based at least in part on the indication in the capability information that indicates that the UE is capable of monitoring for the more than one downlink shared channel transmission within the slot for at least the frequency band in at least one frequency band combination.

Aspect 27: The method of any of aspects 25 through 26, further comprising: determining the first set of CCs as all of the one or more CCs in a cell group based at least in part on the indication in the capability information that indicates that the UE is capable of monitoring for the more than one downlink shared channel transmission within the slot for at least the frequency band in at least one frequency band combination that includes the cell group.

Aspect 28: The method of any of aspects 25 through 27, further comprising: determining the first set of CCs as all of the one or more CCs in the frequency band based at least in part on the indication in the capability information that indicates that the UE is capable of monitoring for the more than one downlink shared channel transmission within the slot for the frequency band in at least one frequency band combination.

Aspect 29: The method of any of aspects 25 through 28, further comprising: determining the first set of CCs as all of the one or more CCs in the frequency band based at least in part on the indication in the capability information that indicates that the UE is capable of monitoring for the more than one downlink shared channel transmission within the slot for the frequency band in at least one frequency band combination, wherein the at least one frequency band combination corresponds to the one or more CCs in one or more frequency bands.

Aspect 30: The method of any of aspects 24 through 29, wherein receiving the feedback comprises: receiving the feedback for a single candidate downlink shared channel occasion over a second set of CCs without identifying TDRA groups of non-overlapping SLIVs.

Aspect 31: The method of any of aspects 24 through 30, wherein the UE capability for the processing of the PDSCH included in the capability information includes one or more of a first UE capability associated with a first processing capability, a second UE capability associated with a second processing capability applicable for a plurality of sub-carrier spacings, and a limited second UE capability associated with the second processing capability applicable for a subset of the plurality of sub-carrier spacings, in addition to a CBG processing capability, wherein the first processing capability and the second processing capability are different.

Aspect 32: The method of aspect 31, further comprising: determining that the UE is capable of monitoring for the more than one downlink shared channel transmission within the slot based at least in part on the indication being associated with the first UE capability without a CBG processing type being enabled.

Aspect 33: The method of any of aspects 31 through 32, further comprising: determining that the UE is capable of monitoring for the more than one downlink shared channel transmission within the slot based at least in part on second control information that enables at least one of a second UE processing type or a limited second UE processing type for the UE.

Aspect 34: The method of aspect 33, further comprising: determining that the UE is capable of monitoring for the more than one downlink shared channel transmission within the slot based at least in part on the indication being associated with the first UE capability and in an absence of the second UE processing type, the limited second UE processing type, and a CBG processing type being enabled.

Aspect 35: The method of any of aspects 33 through 34, further comprising: transmitting second control information that enables a CBG processing type for the UE; and determining that the UE is capable of monitoring for the more than one downlink shared channel transmission within the slot based at least in part on the indication being associated with the first UE capability and on the CBG processing type being enabled, and in an absence of the second UE processing type and the limited second UE processing type being enabled.

Aspect 36: The method of any of aspects 33 through 35, further comprising: transmitting second control information that enables a CBG processing type for the UE and enables at least one of the second UE processing type or the limited second UE processing type for the UE; and determining that the UE is capable of monitoring for the more than one downlink shared channel transmission within the slot based at least in part on the indication being associated with one of the second UE processing type or the limited second UE processing type and on the CBG processing type being enabled.

Aspect 37: The method of any of aspects 33 through 36, further comprising: transmitting second control information that enables at least one of the second UE processing type or the limited second UE processing type for the UE; and determining that the UE is capable of monitoring for the more than one downlink shared channel transmission within the slot based at least in part on the indication being associated with one of the second UE processing type or the limited second UE processing type, and in an absence of a CBG processing type being enabled.

Aspect 38: The method of aspect 37, further comprising: determining that the UE is capable of monitoring for the more than one downlink shared channel transmission within the slot is further based at least in part on at least one of the second UE processing type or the limited second UE processing type indicating that the UE is capable of monitoring for the more than one downlink shared channel transmission within the slot.

Aspect 39: A method for wireless communication at a network entity, comprising: transmitting control information indicative of a codebook for HARQ-ACK at a UE, wherein the control information includes a first parameter that disables or enables the UE to monitor for more than one downlink shared channel transmission per slot; transmitting one or more downlink shared channel transmissions; and receiving feedback for one or more CCs based at least in part on the first parameter, wherein the feedback is included in the codebook for the HARQ-ACK of the one or more downlink shared channel transmissions, and wherein the codebook is based at least in part on the control information.

Aspect 40: The method of aspect 39, further comprising: receiving capability information that indicates a UE capability for processing of a PDSCH, wherein the capability information includes an indication of a quantity of downlink shared channel transmissions the UE is capable of monitoring for within a slot.

Aspect 41: The method of any of aspects 39 through 40, wherein the first parameter enables the UE to monitor for the more than one downlink shared channel transmission per slot on a per CC basis, or on a per BWP basis, or on a per cell group basis.

Aspect 42: The method of any of aspects 39 through 41, wherein transmitting the control information comprises: transmitting a second indication of a maximum quantity of downlink shared channel transmissions the UE is capable of monitoring for within the slot.

Aspect 43: The method of any of aspects 39 through 42, further comprising: receiving a second UE capability for monitoring for the control information that includes the first parameter.

Aspect 44: The method of any of aspects 39 through 43, further comprising: transmitting second control information that includes a second parameter that enables the first parameter on a per cell group basis, wherein the first parameter is on a per CC basis or on a per BWP basis.

Aspect 45: The method of any of aspects 39 through 44, wherein transmitting the control information comprises: transmitting the first parameter, wherein the first parameter enables the UE to monitor for more than one downlink shared channel transmissions per slot or disables the UE to monitor for a single downlink shared channel transmission per slot.

Aspect 46: The method of any of aspects 39 through 45, wherein transmitting the control information comprises: transmitting the first parameter, wherein the first parameter enables the UE to monitor for a single downlink shared channel transmission per slot or disables the UE to monitor for more than one downlink shared channel transmissions per slot.

Aspect 47: A UE for wireless communication, comprising one or more memories storing processor-executable code; and one or more processors coupled with the one or more memories and individually or collectively operable to execute the code to cause the UE to perform a method of any of aspects 1 through 15.

Aspect 48: A UE for wireless communication, comprising at least one means for performing a method of any of aspects 1 through 15.

Aspect 49: A non-transitory computer-readable medium storing code for wireless communication at a UE, the code comprising instructions executable by one or more processors to perform a method of any of aspects 1 through 15.

Aspect 50: A UE for wireless communication, comprising one or more memories storing processor-executable code; and one or more processors coupled with the one or more memories and individually or collectively operable to execute the code to cause the UE to perform a method of any of aspects 16 through 23.

Aspect 51: A UE for wireless communication, comprising at least one means for performing a method of any of aspects 16 through 23.

Aspect 52: A non-transitory computer-readable medium storing code for wireless communication at a UE, the code comprising instructions executable by one or more processors to perform a method of any of aspects 16 through 23.

Aspect 53: A network entity for wireless communication, comprising one or more memories storing processor-executable code; and one or more processors coupled with the one or more memories and individually or collectively operable to execute the code to cause the UE to cause the apparatus to perform a method of any of aspects 24 through 38.

Aspect 54: A network entity for wireless communication, comprising at least one means for performing a method of any of aspects 24 through 38.

Aspect 55: A non-transitory computer-readable medium storing code for wireless communication at a network entity, the code comprising instructions executable by one or more processors to perform a method of any of aspects 24 through 38.

Aspect 56: A network entity for wireless communication, comprising one or more memories storing processor-executable code; and one or more processors coupled with the one or more memories and individually or collectively operable to execute the code to cause the UE to perform a method of any of aspects 39 through 46.

Aspect 57: A network entity for wireless communication, comprising at least one means for performing a method of any of aspects 39 through 46.

Aspect 58: A non-transitory computer-readable medium storing code for wireless communication at a network entity, the code comprising instructions executable by one or more processors to perform a method of any of aspects 39 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

receive control information indicative of a codebook for hybrid automatic repeat request acknowledgment at the UE, wherein the control information includes a first parameter that disables or enables the UE to monitor for more than one downlink shared channel transmission per slot;

monitor for one or more downlink shared channel transmissions based at least in part on the control information; and generate the codebook for the hybrid automatic repeat request acknowledgment of the one or more downlink shared channel transmissions, wherein the codebook is based at least in part on the control information and includes feedback for one or more component carriers based at least in part on the first parameter.

2. The UE of claim 1, wherein the first parameter enables the UE to monitor for the more than one downlink shared channel transmission per slot on a per component carrier basis, or on a per bandwidth part basis, or on a per cell group basis.

3. The UE of claim 1, wherein the one or more processors are individually or collectively further operable to execute the code to cause the UE to:

transmit a second UE capability for monitoring for the control information that includes the first parameter.

4. The UE of claim 1, wherein, to receive the control information, the one or more processors are individually or collectively further operable to execute the code to cause the UE to:

receive the first parameter, wherein the first parameter enables the UE to monitor for more than one downlink shared channel transmissions per slot or disables the UE to monitor for a single downlink shared channel transmission per slot.

5. The UE of claim 1, wherein, to receive the control information, the one or more processors are individually or collectively further operable to execute the code to cause the UE to:

receive the first parameter, wherein the first parameter enables the UE to monitor for a single downlink shared channel transmission per slot or disables the UE to monitor for more than one downlink shared channel transmissions per slot.

6. The UE of claim 1, wherein the one or more processors are individually or collectively further operable to execute the code to cause the UE to:

transmit capability information that indicates a UE capability for processing of a physical downlink shared channel, wherein the capability information includes an indication of a quantity of downlink shared channel transmissions the UE is capable of monitoring for within a slot.

7. The UE of claim 1, wherein, to receive the control information, the one or more processors are individually or collectively further operable to execute the code to cause the UE to:

receive a second indication of a maximum quantity of downlink shared channel transmissions the UE is capable of monitoring for within the slot.

8. The UE of claim 1, wherein the one or more processors are individually or collectively further operable to execute the code to cause the UE to:

receive second control information that includes a second parameter that enables the first parameter on a per cell group basis, wherein the first parameter is on a per component carrier basis or on a per bandwidth part basis.

9. A network entity for wireless communication, comprising:

one or more memories storing processor-executable code; and one or more processors coupled with the one or more memories and individually or collectively operable to execute the code to cause the network entity to:

transmit control information indicative of a codebook for hybrid automatic repeat request acknowledgment at a user equipment (UE), wherein the control information includes a first parameter that disables or enables the UE to monitor for more than one downlink shared channel transmission per slot;

transmit one or more downlink shared channel transmissions based at least in part on the control information; and receive feedback for one or more component carriers based at least in part on the first parameter, wherein the feedback is included in the codebook for the hybrid automatic repeat request acknowledgment of the one or more downlink shared channel transmissions, and wherein the codebook is based at least in part on the control information.

10. The network entity of claim 9, wherein the first parameter enables the UE to monitor for the more than one downlink shared channel transmission per slot on a per component carrier basis, or on a per bandwidth part basis, or on a per cell group basis.

11. The network entity of claim 9, wherein the one or more processors are individually or collectively further operable to execute the code to cause the network entity to:

receive a second UE capability for monitoring for the control information that includes the first parameter.

12. The network entity of claim 9, wherein, to transmit the control information, the one or more processors are individually or collectively further operable to execute the code to cause the network entity to:

transmit the first parameter, wherein the first parameter enables the UE to monitor for more than one downlink shared channel transmissions per slot or disables the UE to monitor for a single downlink shared channel transmission per slot.

13. The network entity of claim 9, wherein, to transmit the control information, the one or more processors are individually or collectively further operable to execute the code to cause the network entity to:

transmit the first parameter, wherein the first parameter enables the UE to monitor for a single downlink shared channel transmission per slot or disables the UE to monitor for more than one downlink shared channel transmissions per slot.

14. The network entity of claim 9, wherein the one or more processors are individually or collectively further operable to execute the code to cause the network entity to:

receive capability information that indicates a UE capability for processing of a physical downlink shared channel, wherein the capability information includes an indication of a quantity of downlink shared channel transmissions the UE is capable of monitoring for within a slot.

15. The network entity of claim 9, wherein, to transmit the control information, the one or more processors are individually or collectively further operable to execute the code to cause the network entity to:

transmit a second indication of a maximum quantity of downlink shared channel transmissions the UE is capable of monitoring for within the slot.

16. The network entity of claim 9, wherein the one or more processors are individually or collectively further operable to execute the code to cause the network entity to:

transmit second control information that includes a second parameter that enables the first parameter on a per cell group basis, wherein the first parameter is on a per component carrier basis or on a per bandwidth part basis.

17. A method for wireless communication at a user equipment (UE), comprising:

receiving control information indicative of a codebook for hybrid automatic repeat request acknowledgment at the UE, wherein the control information includes a first parameter that disables or enables the UE to monitor for more than one downlink shared channel transmission per slot;

monitoring for one or more downlink shared channel transmissions based at least in part on the control information; and generating the codebook for the hybrid automatic repeat request acknowledgment of the one or more downlink shared channel transmissions, wherein the codebook is based at least in part on the control information and includes feedback for one or more component carriers based at least in part on the first parameter.

18. The method of claim 17, wherein the first parameter enables the UE to monitor for the more than one downlink shared channel transmission per slot on a per component carrier basis, or on a per bandwidth part basis, or on a per cell group basis.

19. The method of claim 17, further comprising:

transmitting a second UE capability for monitoring for the control information that includes the first parameter.

20. The method of claim 17, wherein receiving the control information comprises:

receiving the first parameter, wherein the first parameter enables the UE to monitor for more than one downlink shared channel transmissions per slot or disables the UE to monitor for a single downlink shared channel transmission per slot.

21. The method of claim 17, wherein receiving the control information comprises:

receiving the first parameter, wherein the first parameter enables the UE to monitor for a single downlink shared channel transmission per slot or disables the UE to monitor for more than one downlink shared channel transmissions per slot.

22. The method of claim 17, further comprising:

transmitting capability information that indicates a UE capability for processing of a physical downlink shared channel, wherein the capability information includes an indication of a quantity of downlink shared channel transmissions the UE is capable of monitoring for within a slot.

23. The method of claim 17, wherein receiving the control information comprises:

receiving a second indication of a maximum quantity of downlink shared channel transmissions the UE is capable of monitoring for within the slot.

24. The method of claim 17, further comprising:

receiving second control information that includes a second parameter that enables the first parameter on a per cell group basis, wherein the first parameter is on a per component carrier basis or on a per bandwidth part basis.

25. A method for wireless communication at a network entity, comprising:

transmitting control information indicative of a codebook for hybrid automatic repeat request acknowledgment at a user equipment (UE), wherein the control information includes a first parameter that disables or enables the UE to monitor for more than one downlink shared channel transmission per slot;

transmitting one or more downlink shared channel transmissions based at least in part on the control information; and receiving feedback for one or more component carriers based at least in part on the first parameter, wherein the feedback is included in the codebook for the hybrid automatic repeat request acknowledgment of the one or more downlink shared channel transmissions, and wherein the codebook is based at least in part on the control information.

26. The method of claim 25, wherein the first parameter enables the UE to monitor for the more than one downlink shared channel transmission per slot on a per component carrier basis, or on a per bandwidth part basis, or on a per cell group basis.

27. The method of claim 25, further comprising:

receiving a second UE capability for monitoring for the control information that includes the first parameter.

28. The method of claim 25, wherein transmitting the control information comprises:

transmitting the first parameter, wherein the first parameter enables the UE to monitor for more than one downlink shared channel transmissions per slot or disables the UE to monitor for a single downlink shared channel transmission per slot.

29. The method of claim 25, further comprising:

receiving capability information that indicates a UE capability for processing of a physical downlink shared channel, wherein the capability information includes an indication of a quantity of downlink shared channel transmissions the UE is capable of monitoring for within a slot.

30. The method of claim 25, wherein transmitting the control information comprises:

transmitting a second indication of a maximum quantity of downlink shared channel transmissions the UE is capable of monitoring for within the slot.

* * * * *